United States Patent
Shimosako

[11] Patent Number: 5,915,002
[45] Date of Patent: Jun. 22, 1999

[54] COMMUNICATION DEVICE

[75] Inventor: Toshio Shimosako, Tenri, Japan

[73] Assignee: Sharp Kabushiki Kaisha, Osaka, Japan

[21] Appl. No.: 08/508,558

[22] Filed: Jul. 28, 1995

[30] Foreign Application Priority Data

Aug. 2, 1994 [JP] Japan .................................. 6-181457

[51] Int. Cl.⁶ .............................................. H04M 11/00
[52] U.S. Cl. .................................. 379/93.07; 379/93.31; 379/93.34; 379/556; 379/557
[58] Field of Search .................... 379/93, 98, 97, 379/96, 100, 58, 59, 442, 93.05, 93.07, 93.28, 93.29, 93.31, 100.12, 102.02, 100.17, 93.09; 455/425, 426, 466, 556, 557

[56] References Cited

U.S. PATENT DOCUMENTS

| | | | |
|---|---|---|---|
| 4,837,812 | 6/1989 | Takahashi et al. | 379/98 |
| 4,972,457 | 11/1990 | O'Sullivan | 379/59 |
| 4,991,197 | 2/1991 | Morris | 379/58 |
| 5,353,334 | 10/1994 | O'Sullivan | 379/59 |
| 5,428,671 | 6/1995 | Dykes et al. | 379/93 |
| 5,524,047 | 6/1996 | Brown et al. | 379/93 |
| 5,602,902 | 2/1997 | Satterlund et al. | 379/59 |
| 5,790,656 | 8/1998 | Rahamim et al. | 379/93.09 |

FOREIGN PATENT DOCUMENTS

| | | |
|---|---|---|
| 125763 | 8/1987 | Japan . |
| 129649 | 9/1989 | Japan . |
| 48771 | 2/1993 | Japan . |

Primary Examiner—Stella Woo

[57] ABSTRACT

When a type of a connected channel is to be detected, a CPU of a communication device sets a channel in an off-hook state by closing a channel closing section, and an existence of the DC current supplied through the cable channel is detected based on an output from a DC current detecting circuit. The CPU sets the connected channel in the off-hook state by switching a switching section to the radio channel, and detects an existence of a dial-tone signal transmitted through the radio channel via a modem. The CPU determines which one of the cable channel and the radio channel is connected to the communication device, or none of them are connected. The described arrangement enables an automatic detection of a type of a connected channel without using a special adaptor for each channel that is required in the conventional communication device provided with the automatic detecting function of the type of the channel, and also enables a reduction in cost and size of the communication device.

11 Claims, 16 Drawing Sheets

COMMUNICATION DEVICE

FIELD OF THE INVENTION

The present invention relates to a communication device which is either stored in a network terminal equipment of various types such as a notebook personal computer, etc., or connected to an external section of such terminal equipment, more particularly relates to a communication device that can be selectively connected to either one of a cable channel and a radio channel.

BACKGROUND OF THE INVENTION

A communication device with a modulation-demodulation function provided with interfaces on both the terminal side and the network side is known as means for connecting a portable information terminal equipment such as a notebook personal computer or an electric organizer, etc., to the public telephone network. The communication device can be switched to either one of a cable channel such as a public telephone network, etc., and a radio channel such as a cellular telephone network, etc., so that either one of the channels can be selectively used. However, the described communication device has the following problems. The user must perform a troublesome operation of setting various values, for example, for altering set values in a modem, converting a protocol, etc., according to the type of a channel to be used, which results in low operability. Moreover, if the setting is not made correctly for the type of the channel to be used, in the worst case, the communication may not be performed, thereby presenting the problem of poor usability.

There is a known method of eliminating the described inconveniences, wherein a special adaptor having an adaptor identification signal output section formed therein is adopted for connecting the cable channel or the radio channel to the communication device, and by connecting thereto the adaptor, the communication device automatically identifies the type of the connected channel. As illustrated in FIG. 16, the described communication device includes a cable channel connector 55, a radio channel connector 56 and an external control terminal connector 57. To the cable channel connector 55, connected is a cable channel adaptor 52 for connecting the communication device 51 and the cable channel. To the radio channel connector 56, connected is a radio channel adaptor 53, and with the adaptor 53, the communication device 51 is connected to an analog signal input-output terminal (audio terminal) normally provided in a wireless telephone, etc. In the described manner, the communication device 51 is connected to the radio channel. To the external control terminal connector 57, connected is an external control adaptor 54 for connecting the communication device 51 and an external control terminal such as a notebook personal computer, etc.

FIG. 17 illustrates the configuration of essential parts of the communication device 51. The communication device 51 includes: a channel identifying circuit 58 for determining a type of a channel connected to the device, a Network Control Unit (NCU) 59 for controlling communications with respect to a public telephone network, a switching section 60 for switching a channel to be used, a modem 61, a CPU (Central Processing Unit) 62 for controlling the operation of the entire device, a ROM (Read Only Memory) 63 for storing therein operation programs of the CPU 62.

The CPU 62 controls the communication device 51 in the following manner. When connection channel information is requested from the external control terminal, the CPU 62 identifies the type of the channel currently connected based on a channel identification signal from the channel identifying circuit 58, and outputs a code corresponding to the connected channel to the external control terminal. Then, the external control terminal which receives the code determines various values and the protocol according to the connected channel, thereby controlling the communication device 51.

FIG. 18 is a circuit diagram schematically showing an internal circuit structure of the channel identifying circuit 58, and the channel adaptors 52 and 53. When the channel adaptors 52 and 53 are respectively connected to the connectors 55 and 56 of the communication device 51, adaptor identification signals a, b, c and d that are set in the cable channel adaptor 52 and the radio channel adaptor 53 are inputted to the channel identifying circuit 58. Further, the channel identification signals e and f according to the adaptor identification signals a, b, c and d are sent from the circuit identifying circuit 58 to the CPU 62. The adaptor identification signals a, b, c and d set in an adaptor differ between the cable channel adaptor 52 and the radio channel adaptor 53.

In the described example of the circuit, a logic wherein a high circuit level is represented by "1", and a low circuit level is represented by "0" is adopted. In the cable channel adaptor 52, the identification signal a and the identification signal b are respectively set to "1" and "0". On the other hand, in the radio channel adaptor 53, the channel identification signals c and d are respectively set to "0" and "1". In this example of the circuit, in the state where both adaptors 52 and 53 are connected, both of the channel identification signals e and f to be outputted to the CPU 62 is set to "0". In the case where neither of the adaptors 52 and 53 are connected, both of the channel identification signals e and f are respectively set to "1". On the other hand, if only the cable channel adaptor 52 is connected, the channel identification signals e and f are respectively set to "1" and "0", while in the case where only the radio channel adaptor 53 is connected, the channel identification signals e and f are respectively set to "0" and "1". The CPU 62 identifies the type of the connected channel based on the channel identification signals e and f outputted from the channel identifying circuit 58.

However, in the described arrangement, the special cable channel adaptor 52 and radio channel adaptor 53 are required for the communication device 51, and a commercially available cable or a cable which is equipped with or available as an optional component of a radio telephone machine cannot be used without modifying it. Therefore, in the aspect of the manufactures, since a cable optionally available for the communication device 51 must be developed, it takes time for the development. Moreover, in the aspect of the user, since the cable optionally available for the communication device 51 is additionally required, a high cost is incurred.

Furthermore, the channel adaptors 52 and 53 are always required for connecting the communication device 51 to the cable channel and/or the radio channel, thereby presenting the problem that the device becomes larger in size.

The Japanese Laid-Open Patent Publication No. 48771/1993 (Tokukaihei 5-48771) discloses a communication device where a public switched telephone network (PSTN) and an integrated services digital network (ISDN) are connected, and a communication is performed by selecting one of the two channels. In this communication device, the selection of the channel is performed by the input operation by the user, and both of the connected channels are cable channels. In these points, the present invention should be distinctive of the above-mentioned Publication.

The Japanese Laid-Open Patent Publication No. 125763/1987 (Tokukaisho 62-125763) discloses a branch control system by means of a DC branch device. However, the object of this system is to increase the number of control terminals to be connected to a single channel (cable channel). The publication does not refer to the automatic detection system for enabling the discrimination between the cable channel and the radio channel. Thus, the present invention should be distinctive of the described system of the publication.

The Japanese Laid-Open Patent Publication No. 129649/1989 (Tokukaihei 1-129649) discloses a detection method for the hook switch state (the state of the telephone machine connected in parallel to a data communication section for an image data communication, etc.). In this system, unlike the present invention, the state of the detecting section of the hook switch does not serve as the detecting section for the connection of the cable channel/radio channel. Thus, the present invention should be distinctive also of this system.

SUMMARY OF THE INVENTION

An object of the present invention is to provide a communication device of a compact size and of a low price, which is provided with an automatic detecting function for detecting a type of a channel, the communication device ensuring an excellent usability for a user and eliminating a need of a special adaptor.

In order to achieve the above object, a communication device in accordance with the present invention is characterized by including:

cable channel connection means for connecting a cable channel having a DC current power supply;

radio channel connection means for connecting a radio channel;

DC current detection means for detecting a DC current to be supplied through the cable channel in an off-hook state;

dial-tone signal detection means for detecting a dial-tone signal transmitted through the radio channel in the off-hook state;

connected channel detection means which determines that the cable channel is connected to the communication device when the DC current detection means detects the DC current, while determines that the radio channel is connected to the communication device when the dial-tone signal detection means detects the dial-tone signal; and switch means for switching an input/output path of a communication signal between the cable channel connection means and the radio channel connection means according to a result of determination by the connected channel detection means.

In the described arrangement, when the cable channel is connected to cable channel connection means of the communication device, by setting the communication device in the off-hook state, a DC current is supplied through the cable channel provided with the DC current power supply, and the DC current thus supplied is detected by the DC current detection means. On the other hand, in the case where the cable channel is not connected to the cable channel connection means, even if the device is set in the off-hook state, the DC current flowing through the cable channel would not be detected by the DC current detection means. Therefore, based on the result of detection by the DC current detection means, whether or not the cable channel is connected to the communication device can be determined.

The communication device includes the dial-tone signal detection means for detecting a dial-tone signal transmitted through the radio channel in the off-hook state. In the case where the radio channel is connected to the radio channel connection means of the communication device, by setting the device in the off-hook state, the dial-tone signal is transmitted through the radio channel, and the dial-tone signal is detected by the dial-tone signal detection means. On the other hand, in the case where the radio channel is not connected to the radio channel connection means, even if the device is set in the off-hook state, a dial-tone signal would not be detected by the dial-tone signal detection means. Therefore, based on the results of detection by the dial-tone signal detection means, whether or not the radio channel is connected to the communication device can be determined.

The communication device includes the connected channel detection means for determining the type of a channel connected to the device based on the results of detections by the DC current detection means and the dial-tone signal detection means. Thus, a special adaptor for connecting each channel, required in the conventional communication device, is not required, and the type of the connected channel can be automatically detected. For connecting the cable channel and/or radio channel to the communication device, a commercially available cable, or a cable which is equipped with or available as an optional component of a radio telephone machine can be used without modifying it, and a need of the special adaptor can be eliminated. As a result, the described arrangement permits a reduction in cost and size of the communication device.

Another communication device in accordance with the present invention is characterized by including:

cable channel connection means for connecting a cable channel having a DC current power supply;

radio channel connection means for connecting a radio channel;

inversion detection means for detecting a DC current flowing through the cable channel and supervising a direction of the DC current after a calling is made through the cable channel so as to determine if a receiving end has responded;

dial-tone signal detection means for detecting a dial-tone signal transmitted through the radio channel in an off-hook state;

connected channel detection means which determines that the cable channel is connected to the communication device when the inversion detection means detects the DC current flowing through the cable channel, while determines that the radio channel is connected to the communication device when the dial-tone signal detection means detects the dial-tone signal; and switch means for switching an input/output path for a communication signal between the cable channel connection means and the radio channel connection means according to a result of detection by the connected channel detection means.

The described arrangement enables an automatic detection of the type of the connected channel without using a special adaptor for each channel which is required in the conventional communication device. Therefore, for connecting the cable channel and/or radio channel to the communication device, a commercially available cable, or a cable which is equipped with or available as an optional component of a radio telephone machine can be used without modifying it, and a special adaptor is not required. As a result, the described arrangement permits a reduction in cost and size of the communication device. Furthermore, the described arrangement includes the inversion detection means for detecting an inversion of a cable channel by detecting a change in direction of the current flowing through the cable channel after calling through the cable channel as means for detecting the type of the connected channel. Although the inversion detection means is provided for detecting a change in direction of the current flowing through the cable channel, the inversion detection means can be used also as means for detecting the DC current flowing through the cable channel when the communication device is set in the off-hook state. This enables the type of the connected channel to be detected without requiring an arrangement for exclusive use in detecting the DC current flowing through the cable channel. Therefore, the type of the connected channel can be detected without increasing the number of components, a cost of each component, and an area required for mounting the components.

A still another communication device in accordance with the present invention is characterized, by including:

cable channel connection means for connecting a cable channel having a DC current power supply;

radio channel connection means for connecting a radio channel;

hook state detection means for detecting an existence of a DC current flowing through the cable channel and detecting whether the cable channel is in an on-hook state or in an off-hook state;

dial-tone signal detection means for detecting a dial-tone signal transmitted through the radio channel in the off-hook state;

connected channel detection means which determines that the cable channel is connected to the communication device when the hook state detection means detects the DC current flowing through the cable channel, while determines that the radio channel is connected to the communication device when the dial-tone signal detection means detects the dial-tone signal; and switch means for switching an input/output path for a communication signal between the cable channel connection means and the radio channel connection means according to a result of detection by the connected channel detection means.

The described arrangement enables an automatic detection of the type of the connected channel without using a special adaptor for each channel that is required in the conventional communication device.

Therefore, for connecting the cable channel/radio channel to the communication device, a commercially available cable, or a cable that is equipped with or available as an optional component of a radio telephone machine may be used without modifying it, and a special adaptor is not required. As a result, the described arrangement permits a reduction in cost and size of the communication device. Furthermore, in the described arrangement, the hook state detection means for detecting whether the communication device is set in the on-hook state or in the off-hook state by detecting an existence of the current flowing through the cable channel is also used as means for detecting the DC current, based on which the type of the connected channel can be detected. Therefore, the described arrangement enables the type of the connected channel to be detected without a special arrangement for detecting the DC current flowing through the cable channel. Therefore, the detection of the type of, the connected channel is enabled without increasing the number of components, and a cost of each component, and an area required for mounting the components.

A still another communication device in accordance with the present invention is characterized by including:

cable channel connection means for connecting a cable channel having a DC current supply;

radio channel connection means for connecting a radio channel;

CPC signal detection means for detecting a DC current flowing through the cable channel and detecting a CPC signal based on a DC current stopping time;

dial-tone signal detection means for detecting a dial-tone signal transmitted through the radio channel in an off-hook state;

connected channel detection means which determines that the cable channel is connected to the communication device when the CPC signal detection means detects the DC current flowing through the cable channel, while determines that the radio channel is connected to the communication device when the dial-tone signal detection means detects the dial-tone signal; and switch means for switching an input/output path of a communication signal between the cable channel connection means and the radio channel connection means according to a result of detection by the connected channel detection means.

The described arrangement enables an automatic detection of the type of the connected channel without using a special adaptor for each channel that is required in the conventional communication device. Therefore, for connecting the cable channel and/or radio channel to the communication device, a commercially available cable, or a cable that is equipped with or available as an optional component of a radio telephone machine may be used without modifying it, and the special adaptor is not required. As a result, the described arrangement permits a reduction in cost and size of the communication device. Furthermore, in the described arrangement, the CPC signal detection means for detecting a CPC signal by detecting a stopping time of a DC current flowing through the cable channel during the communication is used also as means for detecting the DC current for use in detecting the type of the connected channel. Therefore, the detection of the type of the connected channel is enabled without increasing the number of components, the cost of each component and an area required for mounting the components.

For a fuller understanding of the nature and advantages of the invention, reference should be made to the ensuing detailed description taken in conjunction with the accompanying drawings.

DESCRIPTION OF THE EMBODIMENTS

The following descriptions will discuss one embodiment of the present invention in reference to FIG. 1 through FIG. 8.

Figure 2:
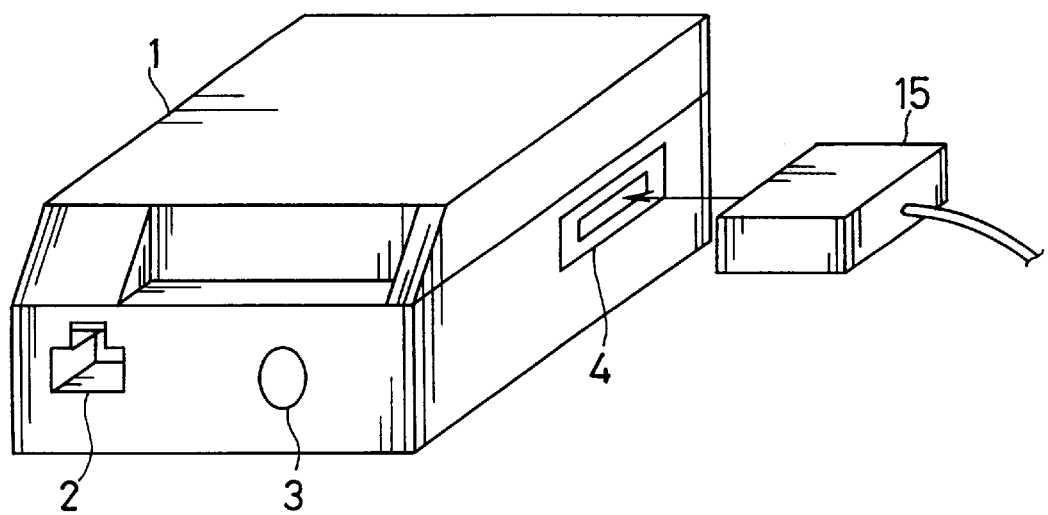
FIG. 2 is a perspective view showing an appearance of the communication device.

As illustrated in FIG. 2, a communication device 1 in accordance with the present embodiment includes a cable channel connector (modular jack) 2, a radio channel connector 3 and an external control terminal connector 4. To the cable channel connector 2, connected is a cable 16 (see FIG. 3) for a cable channel such as a public telephone network, etc., without through a special adaptor required in the conventional arrangement. To the radio channel connector 3, connected is a cable 17 (see FIG. 3) for a radio channel such as a cellular telephone network, etc., without through the special adaptor. To the external control terminal connector 4, connected through an external control terminal adaptor 15 is an external control terminal. Generally, a standardized connector (for example, a pair of terminals such as a serial port, a printer port, etc., a PCMCIA connector, etc.) is used for the external control terminal adaptor 15.

Figure 3:
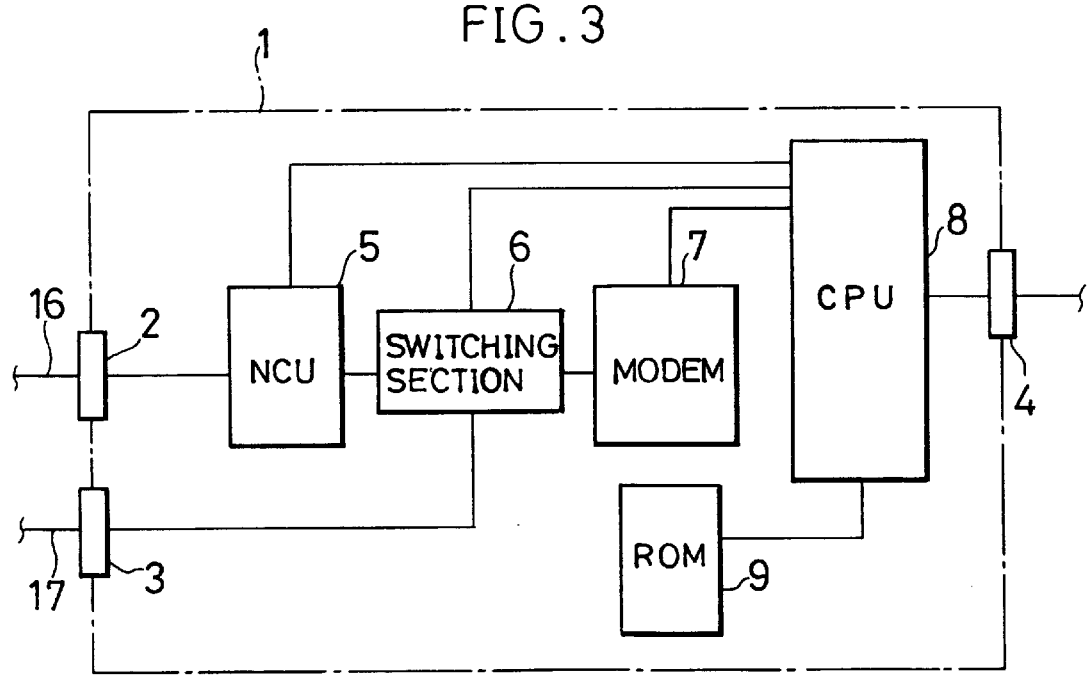
FIG. 3 is a block diagram showing a schematic configuration of the communication device.

FIG. 3 shows a structure of the essential part (control system) of the communication device 1. The communication device 1 includes an NCU 5 for controlling a communication through the cable channel, a switching section 6 for switching a channel to be used, a modem 7 for modulating a transmission signal and demodulating a receiving signal, a CPU 8 for controlling operations of the device, and a ROM 9 for storing therein operation programs for the CPU 8.

The cable 16 for the cable channel is connected to the NCU 5 through the cable channel connector 2. The NCU 5 is connected to the modem 7 through the switching section 6. The cable 17 for the radio channel is connected to the modem 7 through the radio channel connector 3 and the switching section 6. The switching section 6 is provided for switching a path for a communication signal outputted from the modem 7 and a communication signal to be inputted to the modem 7 between the NCU 5 and the radio channel connector 3. The modem 7 demodulates a signal received through the cable channel or the radio channel to be outputted to the CPU 8. The modem 7 also modulates the transmission signal received from the CPU 8 to be outputted to the switching section 6. The CPU 8 outputs the demodulated data received from the modem 7 to the external control terminal through the external control terminal connector 4 and the external control terminal adaptor 15 (see FIG. 2). The CPU 8 also outputs the transmission data received from the external control terminal to the modem 7. The CPU 8 interprets a control command (generally an AT command) to be transmitted from the external control terminal and controls an operation of each unit based on the control command. The various control operations by the CPU 8 are executed based on the program stored in the ROM 9.

The respective operations of the NCU 5, the switching section 6 and the modem 7 are controlled by the CPU 8. For example, under the control of the CPU 8, the NCU 5 switches the state of the communication device between an on-hook state and an off-hook. Under the control of the CPU 8, the switching section 6 switches the path for the communication signal. When an input/output path for the communication signal with respect to the modem 7 is switched to the cable channel, the communication signal outputted from the modem 7 passes the NCU 5 from the switching section 6, and is further transmitted to the cable 16 for the cable channel through the cable channel connector 2. On the other hand, when the input/output path is switched to the radio channel, the communication signal is transmitted from the switching section 6 to the cable 17 for the radio channel through the radio channel connector 3.

Under the control of the CPU 8, the values for the channel to be used (cable channel or radio channel) are set in the modem 7. When the CPU 8 controls the switching section 6 to be switched to the cable channel (or to radio channel), the CPU 8 alters the set values in the modem 7 accordingly. As a result, the communication signal to be inputted to and outputted from the modem 7 is processed as a cable channel signal (a radio channel signal).

Figure 4:
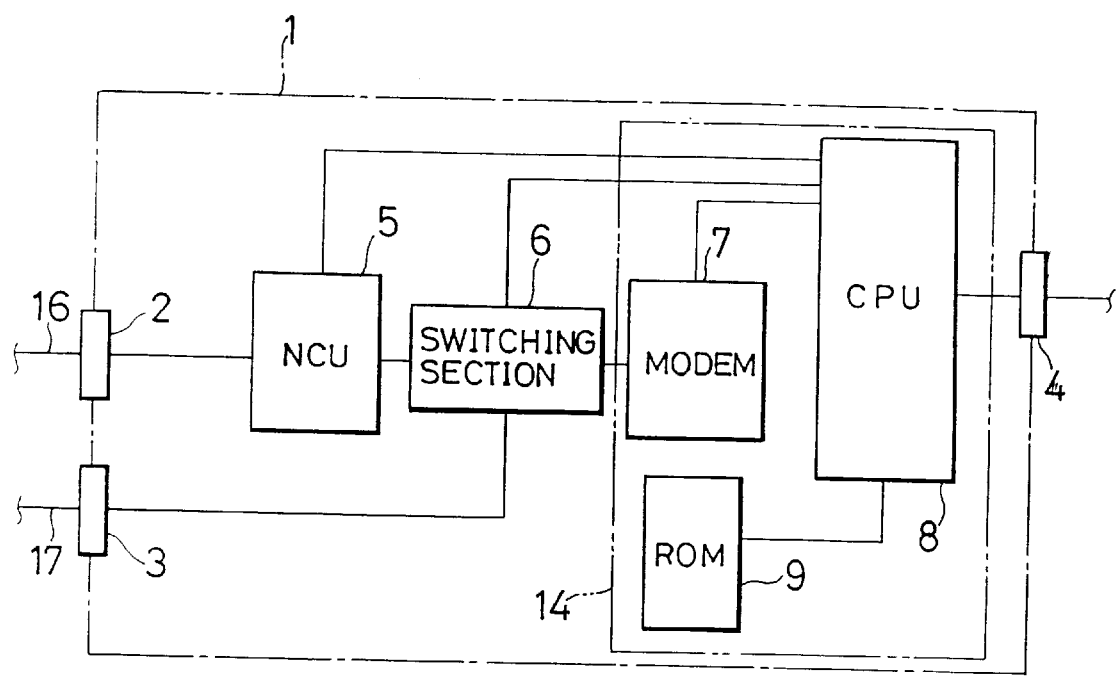
FIG. 4 is a block diagram showing another schematic structure of the communication device which employs a modem chip in which a modem, a CPU and a ROM are combined.

A modem chip wherein the modem 7 and the CPU 8, or the modem 7, the CPU 8 and the ROM 9 are integrated is also known. FIG. 4 shows a control system of the communication device 1 adopting a modem chip 14 in which the modem 7, the CPU 8 and the ROM 9 are integrated. In this case, not only the internal connection of the modem chip 14, but also the operation and the function of the modem chip 14 are identical with those of the device shown in FIG. 3.

Figure 1:
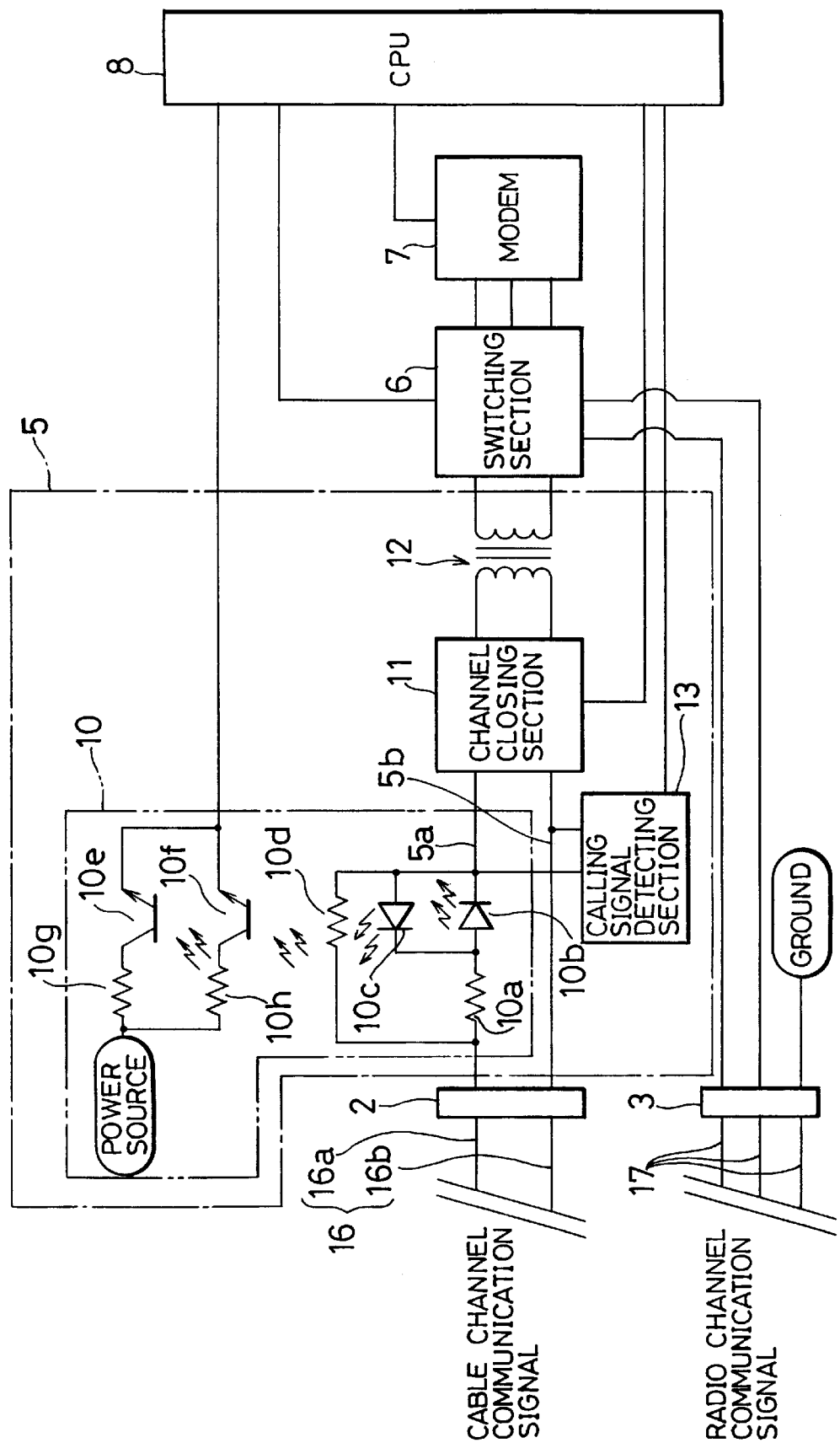
FIG. 1 which shows one embodiment of the present invention is a block diagram showing a structure of the essential parts of a communication device.

FIG. 1 shows essential parts of the communication device 1 in the present invention in detail. As illustrated in FIG. 1, the NCU 5 includes a DC current detecting circuit 10 (DC current detection means) for detecting whether or not a DC current is supplied through the cable channel, a channel closing section 11 for shutting off the DC current to set the cable channel in the on-hook state or the off-hook state, an insulating transformer 12 for enabling a signal to be inputted and outputted through the cable channel in the DC current insulating state and a calling signal detecting section 13 for detecting a calling signal (a signal for ringing) to be transmitted from the cable channel.

Lines designated by reference numerals 16a and 16b in FIG. 1 are two-wires of the cable 16 for the cable channel for transmitting therethrough a two-wire signal for the cable channel. Hereinafter, one of the two wires is referred to as a first wire 16a, and the other wire is referred to as a second wire 16b.

When the cable channel is connected to the communication device 1, the switching section 6 is automatically switched to the cable channel (to be described later in detail). In this state, if the calling signal transmitted through the cable channel is detected by the calling signal detecting section 13, and the detection signal is outputted from the calling signal detecting section 13 to the CPU 8. Here, the CPU 8 controls the channel closing section 11 to close so as to set the communication device 1 in the off-hook state.

The DC current detecting circuit 10 is provided for detecting whether or not the cable channel is connected to the communication device 1. The DC current detecting circuit 10 includes: a photocoupler composed of a photodiode 10b and a phototransistor 10f, a photocoupler composed of a photodiode 10c and a phototransistor 10e and three resistors 10a.10h.10g which restrict a current flowing into the two photocouplers.

The photodiodes 10b.10c of the two photocouplers constitute a parallel circuit in which an anode of the photodiode 10b is connected to a cathode of the photodiode 10c, and a cathode of the photodiode 10b is connected to an anode of the photodiode 10c. The parallel circuit is inserted into a wire 5a connected to the first wire 16a of the cable 16 for the cable channel. According to the described arrangement, the current flowing through the wire 5a can be detected bidirectionally by the two photocouplers. The described bidirectional detection of the current is required because the direction of the DC current flowing through the wire in the off-hook state varies depending on the polarity of a two-wire channel (it is unknown which of the first wire 16a and the second,wire 16b has a higher potential). Needless to say, the two photocouplers may be formed on the wire 5b connected to the second wire 16b. The respective emitters of the phototransistors 10e and 10f of the two photocouplers are connected. The emitters are also connected to the CPU 8 by a single signal wire.

In the case where the cable channel is connected to the communication device 1, by closing the channel closing section 11 to set the communication device 1 in the off-hook state, a direct circuit is formed by connecting the exchange of the cable channel, the two-wire channel (subscriber wire) and communication unit 1. Then, a DC current is supplied to the communication device 1 from the DC current supply in the exchange for the cable channel. The current to be supplied from the cable channel flows in the cable 5a in the NCU 5, and either one of the photodiodes 10e and 10c emits light. As a result, either one of the phototransistors 10e and 10f is turned ON. As a result, the current flows in the emitter, and a DC current detection signal of a high level is sent to the CPU 8.

The CPU 8 identifies the type of the channel connected to the communication device 1 based on a DC current detection signal from the DC current detecting circuit 10 and a dial-tone signal (details will be described later) to be inputted through the modem 7. Then, the CPU 8 informs the external control terminal of the result of detection. Then, the external control terminal determines the set values and the protocol suitable for the channel currently connected based on the connection channel information transmitted from the communication device 1, and performs a communicating operation by operating the communication device 1.

A communicating operation by the external control terminal using the communication device 1 will be explained below in reference to the flowcharts of FIG. 5 and FIG. 6.

Figure 5:
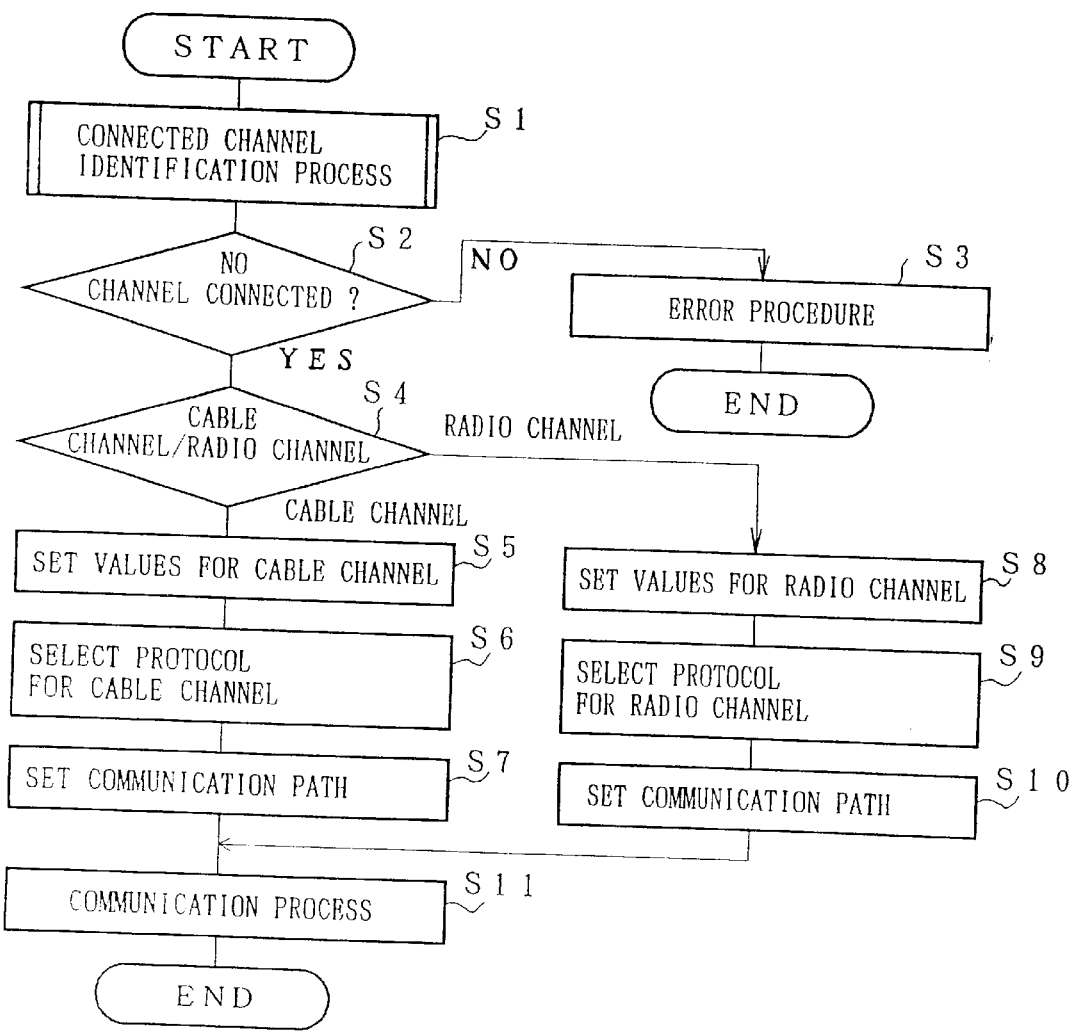
FIG. 5 is a flowchart showing a communicating operation by an external control terminal connected to the communication device.
Figure 6:
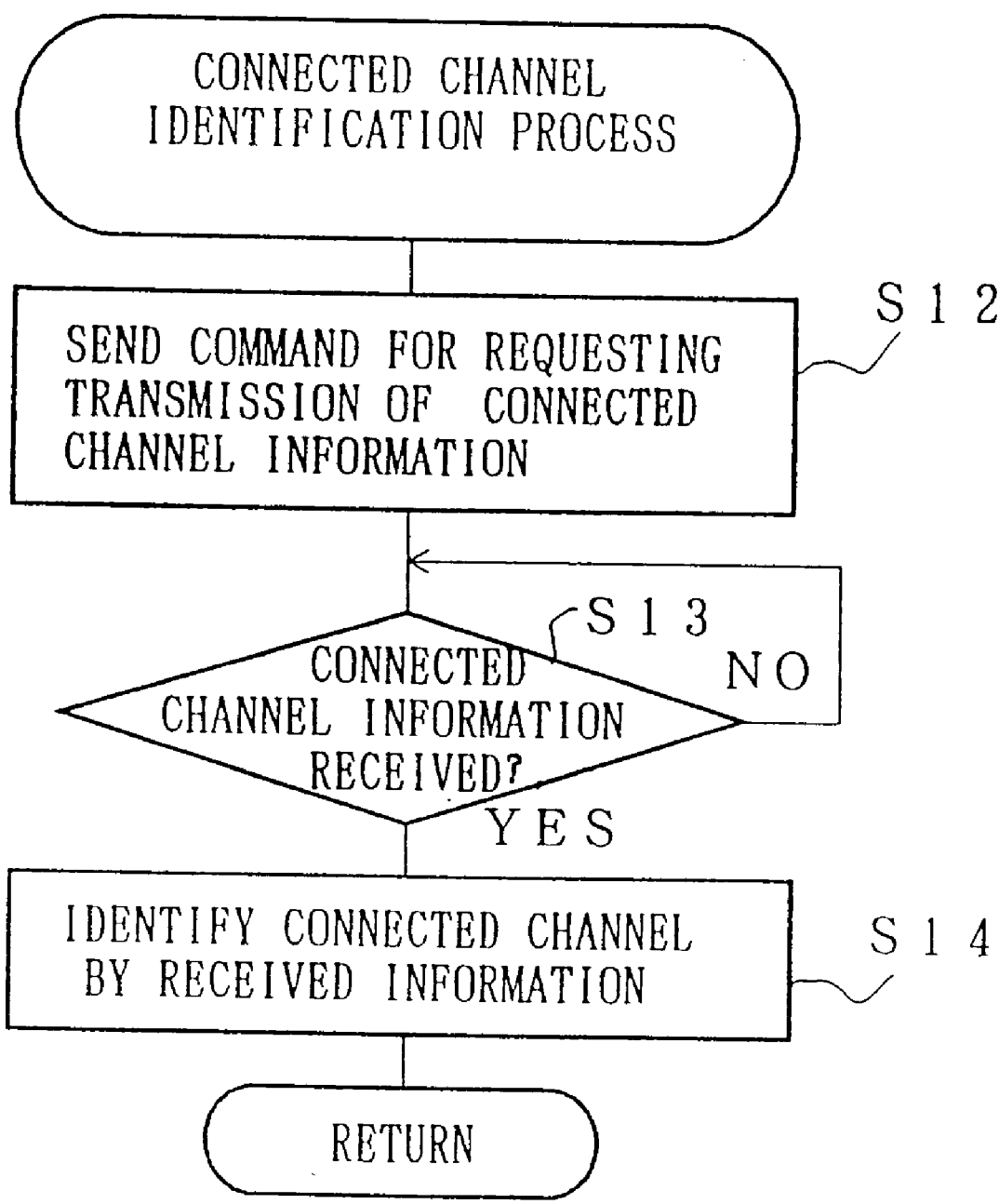
FIG. 6 is a flowchart showing a determining process of a connected channel by the external control terminal.

FIG. 5 shows a main routine. As shown in FIG. 5, first, the identification of the channel currently connected to the communication device 1 is performed (S1). This identification process of the connected channel is shown in FIG. 6 in detail as a sub-routine. First, the external control terminal transmits a command (connection channel information transmission request command) for requesting a transmission of the connection channel information to the communication device 1 (S12). Thereafter, the external control terminal is set in a wait state until the connection channel information is received from the communication device 1. Upon receiving the connection channel information, i.e., if YES in S13, the connected channel is identified based on the received connection channel information (S14). Thereafter, the sequence goes back to the main routine of FIG. 5.

As a result of the connected channel identification process in S1, if it is determined that neither of the cable channel and the radio channel is connected, i.e., if NO in S2, an error procedure is performed, for example, by displaying a message "transmission is not permitted" on a display section (S3). On the other hand, if any channel is connected, i.e., if YES in S2, the various setting processes are branched depending on the type of the connected channel. Specifically, if it is determined that the connected channel is the cable channel (S4), the various values for the cable channel are set (S5), the protocol for the cable channel is selected (S6) and the communication path for the cable channel is set (S7). On the other hand, if it is determined that the connected channel is the radio channel (S4), the values for the radio channel are set (S8), a protocol for the radio channel is selected (S9) and the communication path for the radio channel is set (S10).

In the process of selecting the protocol (S6, S9), if the respective protocols for the cable channel and the radio channel are of only one type, the external control terminal selects and determines the protocol for the connected channel automatically. On the other hand, if the respective protocols for the cable channel and the radio channel are of plural types, candidate protocols are displayed on the display section to be selected by the user, and then according to the selection made by the user, the protocol is determined.

The process of setting the communication path (S7 and S10) is the process of instructing the communication device 1 to switch the input/output path for the communication signal in the communication device 1. In response to the instruction from the external control terminal, the communication device 1 controls the switching section 6.

Upon completing the setting process, the external control terminal executes the communication process (S11).

The operation of the CPU 8 in the communication device 1 to be executed in response to a transmission request for the connection channel information received from the external control terminal will be explained below in reference to the flowcharts of FIG. 7 and FIG. 8.

Figure 7:
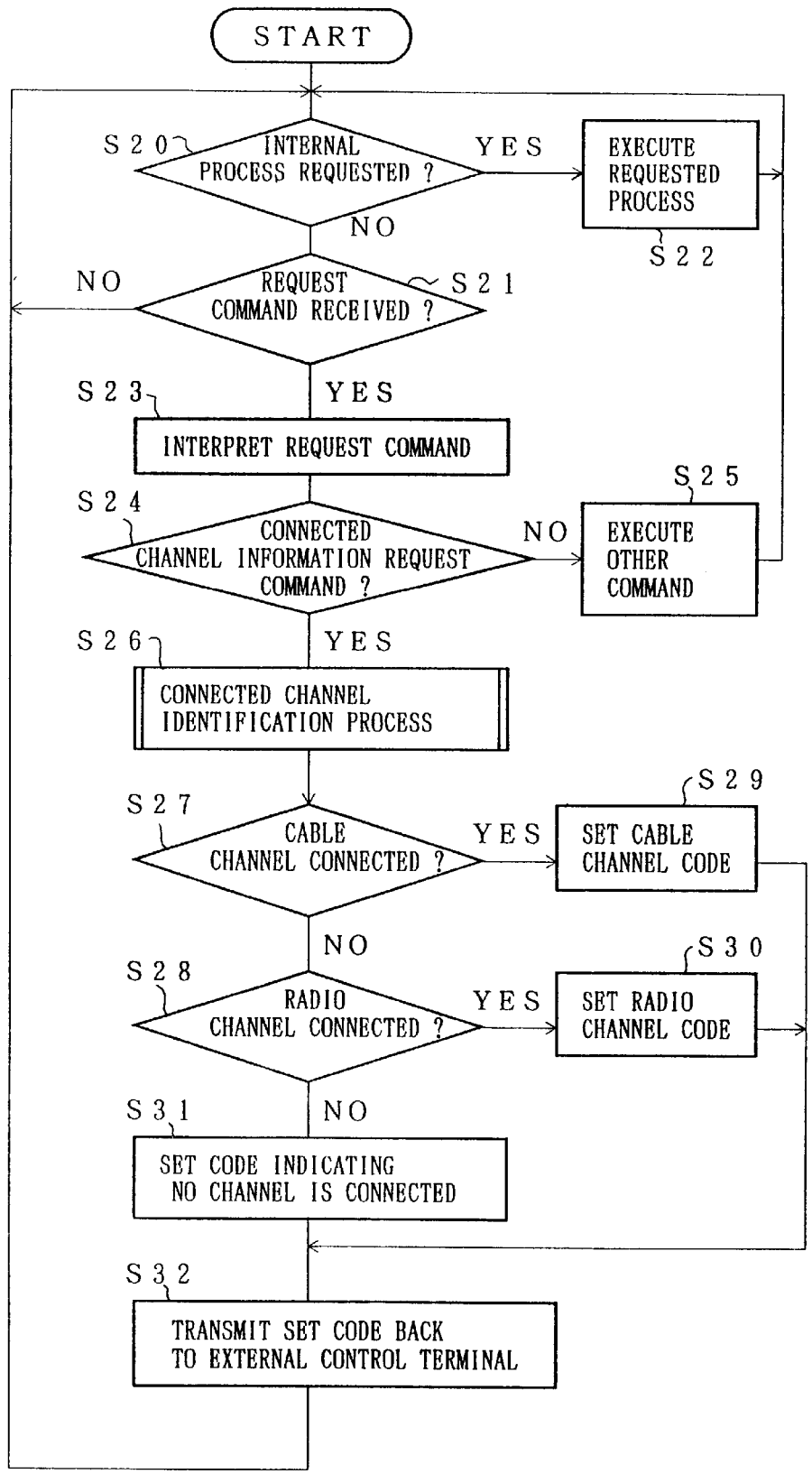
FIG. 7 is a flowchart showing operations by the CPU in the communication device when the communication device receives a transmission request for connected channel information from the external control terminal.

FIG. 7 shows a main routine. As shown in FIG. 7, in the wait state, the CPU 8 of the communication device 1 waits for an internal processing request and a request command from the external control terminal (S20 and S21). If the internal processing request received, i.e, if YES in S20, the requested process is executed (S22), and upon completing the process, the CPU 8 is set back to the wait state.

When a request command is received from the external control terminal, i.e., if YES in S21, the received command is interpreted (S23). If the command is not the connection channel information transmission request command, i.e., if NO in S24, the command process is executed (S25), and upon completing the process, the CPU 8 is set back to the wait state.

If the received command is the connection channel information transmission request command (if YES in S24), the identification process of the currently connected channel is performed (S26). This identification process of the connected channel is shown in detail in FIG. 8 as a sub-routine. First, the CPU 8 controls the channel closing section 11 (shown in FIG. 1) to be closed (S33). Here, if the cable channel is connected to the communication device 1, a DC current supplied from the cable channel flows through the wires 5a and 5b in the NCU 5. In this case, the DC current flows in either one of the photodiodes 10b and 10c so as to emit light therefrom. As a result, either one of the phototransistors 10e and 10f is turned ON, and a emitter current flows therein. Then, a DC current detection signal of a high level is sent to the CPU 8 from the DC current detecting circuit 10. On the other hand, if the cable channel is not connected to the communication device 1, even if the channel closing section 11 is closed, the DC current would not flow in the wires 5a and 5b in the NCU 5, and thus neither of the phototransistors 10e and 10f is turned ON. In this case, the output signal from the DC current detecting circuit 10 remains in the low level, and thus, the DC current detection signal of the high level would not be sent to the CPU 8.

A signal from the DC current detecting circuit 10 is inputted to the CPU 8 (S34), and it is determined whether or not the input signal is the DC current detection signal of the high level (S35). If the input signal is the DC current detection signal of the high level (if YES in S35), it is determined that the cable channel is connected (S36).

If the input signal is low level, there are two possible states: only the radio channel is connected, and neither of the channels is connected. In these states, the CPU 8 executes the following process for determining whether or not the radio channel is connected.

Namely, if the input signal from the DC current detecting circuit 10 is low level, i.e., if NO in S35, it is determined whether or not the current switched state of the switching section 6 is to the radio channel (S37). If not, the CPU 8 controls the switching section 6 so as to be switched to the radio channel (S38). Thereafter, the CPU 8 detects a dial-tone signal from the radio channel in the off-hook state of the radio channel by the modem 7 (S39). Here, the modem 7 and the CPU 8 (which executes the dial-tone signal detection program stored in the ROM 9) constitute the dial-tone signal detection means.

In the present embodiment, by connecting the radio channel connector 3 of the communication device 1, and the analog signal input/output terminal (audio terminal) of the radio telephone machine through the cable, the radio channel is connected to the communication device 1. When setting the radio channel in the off-hook state, the control signal for setting the hook portion of the radio telephone machine in the off-hook state is outputted to the radio telephone machine.

The dial-tone signal suggests a signal (a dial-tone signal which sounds immediately after holding up the handset) to be transmitted from the exchange when the subscriber terminal is switched from the on-hook state to the off-hook state, for informing the subscriber terminal of the communication (calling) permissible state. The exchange of the cable channel such as a public telephone network, etc., and the exchange for the radio channel such as a cellular telephone network, etc., are respectively provided with dial-tone signal sending means for sending a dial-tone signal through the channel.

Upon detecting the dial-tone signal from the modem 7 (if YES in S40), the CPU 8 determines that the radio channel is connected (S41). On the other hand, if the dial-tone signal is not detected (if NO in S40), it is determined that neither of the channels are connected (S42).

Figure 8:
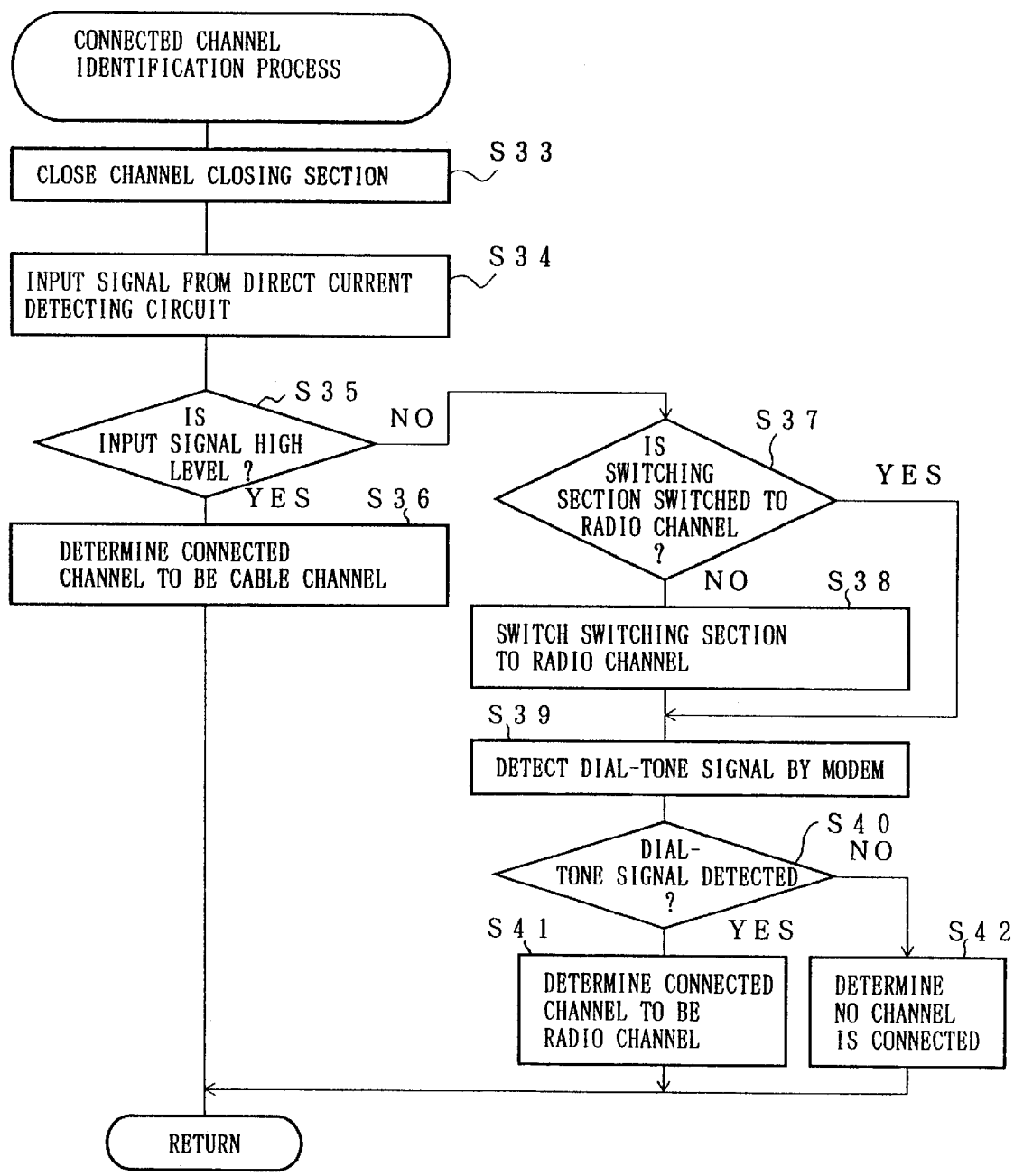
FIG. 8 is a flowchart showing a determining process of a connected channel by the CPU of the communication device.

By the identification process of the connected channel according to the flowchart of FIG. 8, the connection of the cable channel, the connection of the radio channel, and disconnections of both channels can be detected. The connected channel detection means is constituted by the ROM 9 (see FIG. 3 or FIG. 4) for storing the determination processing programs of the connected channel according to the flowchart of FIG. 8 and the CPU 8 which executes the programs. Upon completing the determination process, the sequence goes back to the main routine of FIG. 7.

As a result of the connected channel identification process (S26), if it is determined that the cable channel is connected (if YES in S27), various values for the cable channel are set (S29). The described setting process includes a code setting as connection channel information to be transmitted to the external control terminal, such as a code setting for the cable channel, etc., the setting of time in the inner timer, etc. When it is determined that the cable channel is connected (if YES in S28), various values for the radio channel are set as in the described manner (S30). If it is determined that the channel is not connected (if NO in S28), the code indicating that no channel is connected is set (S31).

After any of the process in S29–S31 is performed, the set code is transmitted to the external control terminal as the connection channel information (S32). Thereafter, the sequence goes back again to S20, and is set in the wait state for an internal request or a request from the external control terminal.

When a DC current detection signal of the high level is inputted to the CPU 8 from the DC current detecting circuit 10, it is determined that the cable channel is connected (S35 and S36 of FIG. 8), and transmits a code of the cable channel as the connection channel information to the external control terminal. By the DC current detection signal of the high level from the DC current detecting circuit 10, it can be seen that at least the cable channel is connected. Here, it is possible that not only the cable channel but also the radio channel is connected. As a note, in the case where both the cable channel and the radio channel are connected, the cable channel which offers a high communication rate at a lower communication fee will be selected. Therefore, as long as it, is confirmed that at least the cable channel is connected, it is not necessarily to determine whether only the cable channel is connected or both the cable channel and the radio channel are connected. Needless to mention, when the DC current detection signal of the high level is inputted to the CPU 8 from the DC current detection signal 10, by switching the switching section 6 to the radio channel to detect the dial-tone signal from the modem 7, it can be determined whether only the cable channel is connected or both channels are connected.

As described, the communication device 1 in accordance with the present embodiment can be connected to the cable channel having the DC current supply, such as a public telephone network, etc., and to a radio channel provided with dial-tone signal sending means such as the cellular telephone network, etc. Here, the communication device 1 selectively communicates with either one of the above-mentioned networks. The communication device 1 includes the DC current detecting circuit 10, the dial-tone signal detection means (modem 7 and CPU 8) and connected channel detection means (CPU 8). The DC current detecting circuit 10 is provided for detecting the DC current supplied through the cable channel in the off-hook state. The dial-tone signal detection means is provided for detecting the dial-tone signal to be transmitted from the radio channel in the off-hook state. The connected channel detection means is provided for determining whether either one of the cable channel and the radio channel is connected, or neither of them is connected to the communication device 1 based on the results of detections by the DC current detecting circuit 10 and the dial-tone signal detection means.

According to the described arrangement, since the connection state of the current channel can be automatically detected in the communication device 1, the system composed of the communication device 1 and the external control terminals can automatically set various communication items according to the type of the connected channel. Additionally, as to the setting items that cannot be determined even after the type of channel is identified, the respective selection lists are prepared for the cable channel and the radio channel for each of such selection items. The selection menu according to the type of the channel determined to be connected is displayed on the display section. This enables the user to select among the selection items without hesitating, thereby providing the system which ensures an excellent usability for the user without difficulties.

The communication device 1 of the present embodiment eliminates a special adaptor for each channel that is required in the conventional communication device provided with the automatic detecting function according to the type of the connected channel, and a commercially available cable or a cable that is equipped with or available as an optional component of the radio telephone machine can be used without modifying it. As described, by eliminating the need of the special adaptor, the manufacturing cost and the size of the communication device can be reduced.

In the conventional arrangement where the type of the channel is automatically detected using a special adaptor for each channel, even if the adaptor itself is not connected to the cable channel or the radio channel, if the adaptor is connected to the communication device, it may be determined that the channel is connected by mistake. On the other hand, in the communication device 1 of the present embodiment, it is determined if each channel is connected by detecting the DC current and the dial-tone signal which are respectively supplied through the cable channel and the radio channel, thereby permitting the determination of whether or not the channel is connected and the identification of the type of the connected channel to be performed with accuracy.

[SECOND EMBODIMENT]

Figure 9:
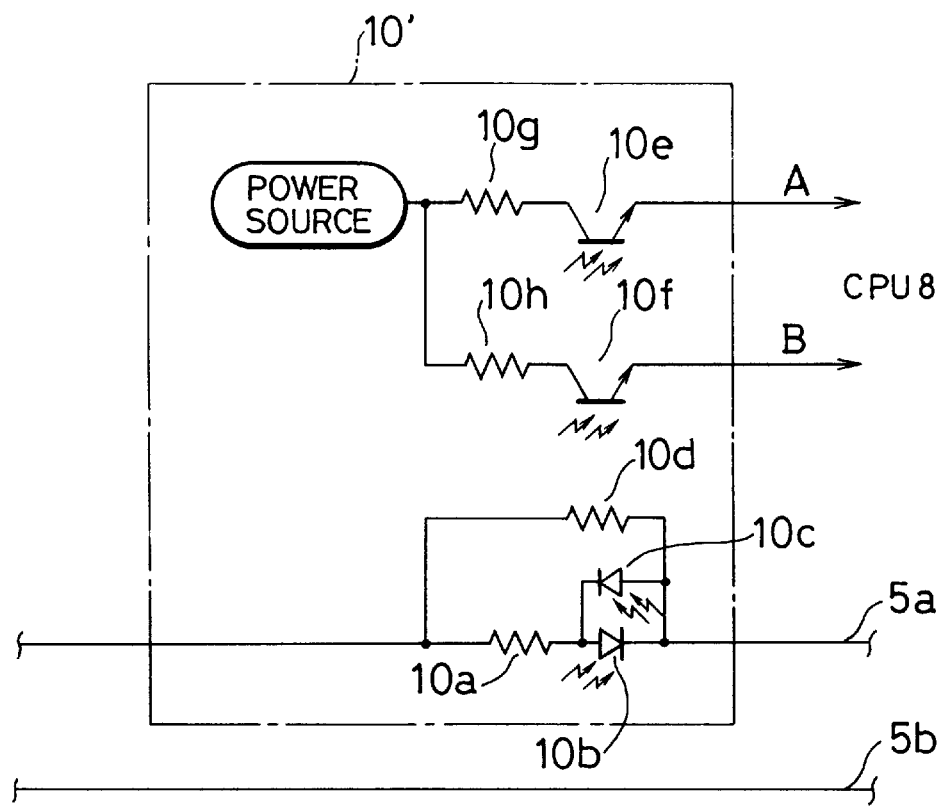
FIG. 9 which shows another embodiment of the present invention is a circuit diagram showing a schematic structure of an inversion detecting circuit provided in the communication device.
Figure 10:
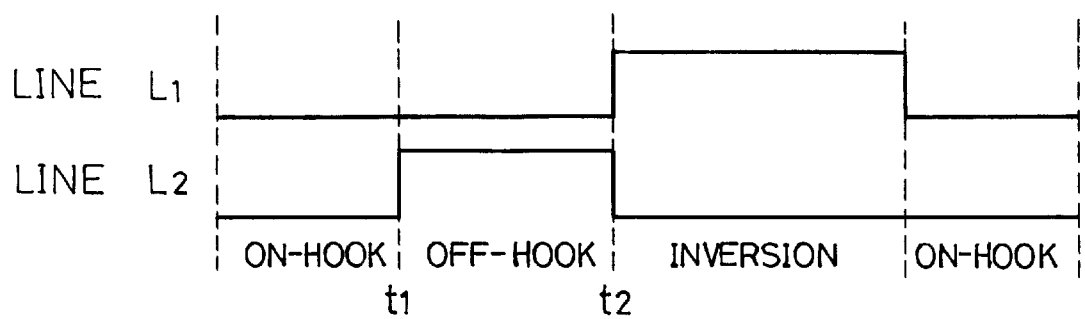
FIG. 10 is a timing chart showing a change in potential of a two-wire circuit when calling through a cable channel.
Figure 11:
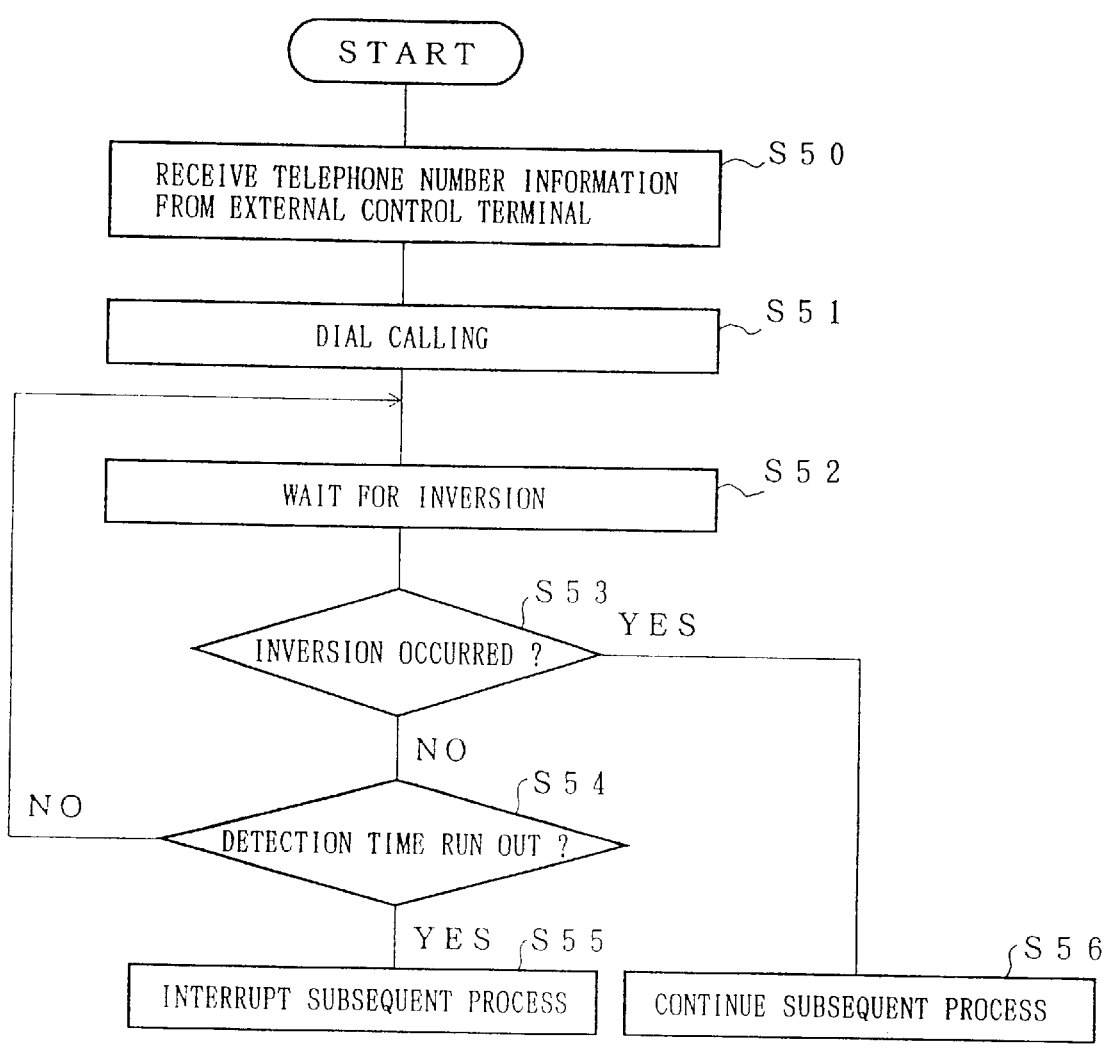
FIG. 11 is a flowchart showing a controlling process when performing an automatic dialing by the CPU in the communication device provided with the inversion detecting circuit.

The following descriptions will discuss another embodiment of the present invention in reference to FIG. 9 through FIG. 11. For convenience in explanations, members having the same functions as those of the aforementioned embodiment will be designated by the same reference numerals, and thus the descriptions thereof shall be omitted here.

A communication device 1 of the present embodiment is characterized in that a conventional inversion detecting circuit provided in the terminal equipment having an automatic dialing function serves also as DC current detection means for detecting the type of the connected channel.

The inversion detecting circuit is provided for detecting an inversion of the two-wire cable channel. The polarity inversion suggests the following: In the case of calling through the cable channel, the off-hook state of receiving end set in response to the calling is detected by the exchange of the cable channel, and the exchange reverses an earth pole and the potential of the channel on the transmitting end (reversing the potential of two wires in the case of adopting the two-wire cable channel). In the described manner, the receiving end informs the transmitting end of the response.

The inversion will be explained in reference to the timing chart of FIG. 10 which shows changes in potential of the two-wire system in response to the calling through the cable channel. In the figure, one of the two-wire is designated by a wire $L_1$ (corresponding to the first wire 16a of the cable channel of FIG. 1), and the other wire is designated by a wire $L_2$ (corresponding to the second wire 16b of the cable 16 for the cable channel of FIG. 1). When the two-wire channel is switched at ti from the on-hook state where the channel closing section 11 is opened to the off-hook state where the channel closing section 11 is closed. Assume here that the wire $L_2$ is set in the high level by the supplied DC current through the cable channel. After the calling is made by the communication device 1 in the described state, at $t_2$ at which the receiving end is switched to the off-hook state, the wire $L_1$ is switched from the low level to the high level, while the wire $L_2$ is switched from the high level to the low level (respective polarities of the wire $L_1$ and the wire $L_2$ are switched). This is referred to as the inversion, and the direction of the DC current flowing through the wire $L_1$ and the wire $L_2$ is inverted.

FIG. 9 shows a schematic circuit structure of an inversion detecting circuit 10'. The inversion detecting circuit 10' is provided in the NCU 5 shown in FIG. 1. The configuration of the hardware of the communication device 1 of the present embodiment is the same as that of the first embodiment except that the inversion detecting circuit 10' is adopted in replace of the DC current detecting circuit 10 of the first embodiment. The difference between the DC current detecting circuit 10 (see FIG. 1) of the first embodiment and the inversion detecting circuit 10' of the present embodiment (see FIG. 9) lies only in the following. One is arranged such that the respective emitters of the phototransistors 10e and 10f are mutually connected to a single signal wire to be inputted to the CPU 8 (corresponding to the DC current detecting circuit 10), while the other is arranged such that the respective emitters of the phototransistors 10e and 10f are not connected, and they are inputted to the CPU 8 through two signal wires (corresponding to the inversion detecting circuit 10'). Other arrangements are identical. In the inversion detecting circuit 10', since it is required to detect the direction of the DC current, the number of signal wires to be connected to the CPU 8 is greater than that of the DC current detecting circuit 10 by one.

When an inversion occurs, since the direction of the DC current flowing through the wire $L_1$ and the wire $L_2$ is reversed, the direction of the DC current flowing through the wires 5a and 5b in the NCU 5 changes. In the off-hook state before the inversion occurs, supposing that the current flows in the photodiode 10c, a current would not flow in the photodiode 10b. In this state, a emitter current flows only in the phototransistor 10e which makes a pair with the photodiode 10c. As a result, the signal wire A shown in FIG. 9 is switched to the high level, and the signal wire B is switched to the low level. In this state, if the inversion occurs, the current does not flow in the photodiode 10c, but in the photodiode 10b. As a result of this inversion, the emitter current flows only in the phototransistor 10f which makes a pair with the photodiode 10b, and the signal wire A and the signal wire B are respectively switched to the low level and the high level. Based on the described change in level of the output signal from the inversion detecting circuit 10', the CPU 8 can detect the occurrence of inversion.

An automatic dialing operation by the CPU 8 of the communication device 1 will be explained in reference to the flowchart of FIG. 11.

If the request command from the external control terminal is a dial calling request command, the CPU 8 receives telephone number information from the external control terminal (S50). Here, the telephone number information is not the data of one digit but string data of telephone numbers. After performing the dial calling process for outputting the telephone number information to the cable channel (S51), the CPU 8 waits for an occurrence of inversion while monitoring the output signal from the inversion detecting circuit 10' (S52). If the inversion is not detected (if NO in S53), it is checked whether or not the detection time set beforehand has elapsed (S54). If not, the CPU 8 waits for the inversion again in S52, while if the detection time has elapsed, the subsequent process is interrupted (S55). On the other hand, if the inversion is detected in S53, the CPU 8 continues the subsequent process (S56).

By using the inversion detecting circuit 10' also as the DC current detection means for detecting the DC current supplied from the cable channel, as in the case of the first embodiment, the type of the connected channel can be detected. Namely, as long as the cable channel is connected to the communication device 1, by controlling the channel closing section 11 to be closed to set the communication device 1 in the off-hook state, either one of the transistors 10e and 10f of the inversion detecting circuit 10' is set in the ON position by the DC current supplied through the cable channel, and either one of the output signal wires A and B is set to the high level. Therefore, the DC current supplied through the cable channel can be detected. By using the output signal from the inversion detecting circuit 10' as the DC current detection signal, the type of the connected channel can be detected in the same manner as the previous embodiment.

As described, the communication device 1 in accordance with the present embodiment is arranged such that the inversion detecting circuit 10' also serves as the DC current detection means for detecting the type of the connected channel by detecting a change in direction of the current flowing through the cable channel when a calling is made through the cable channel.

As described, by using the conventional inversion detecting circuit 10' formed in the device provided with the automatic dialing function as the DC current detection means for detecting the type of the connected channel, the identification of the connected channel (the cable channel or the radio channel) is enabled without increasing the number of components, the cost of each component and the area required for mounting the components.

[THIRD EMBODIMENT]

Figure 12:
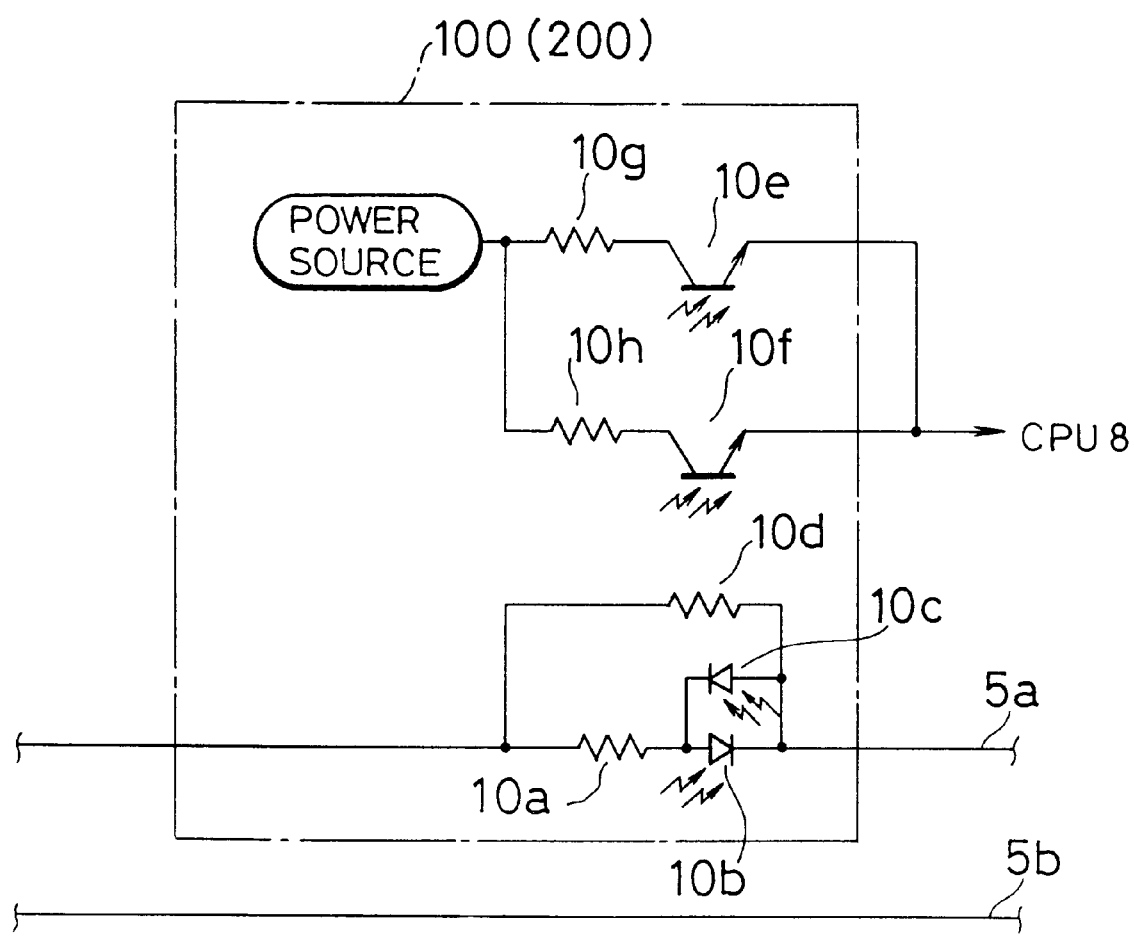
FIG. 12 which shows another embodiment of the present invention is a circuit diagram showing a schematic structure of a hook state detecting circuit or a CPC signal detecting circuit in the communication device.
Figure 13:
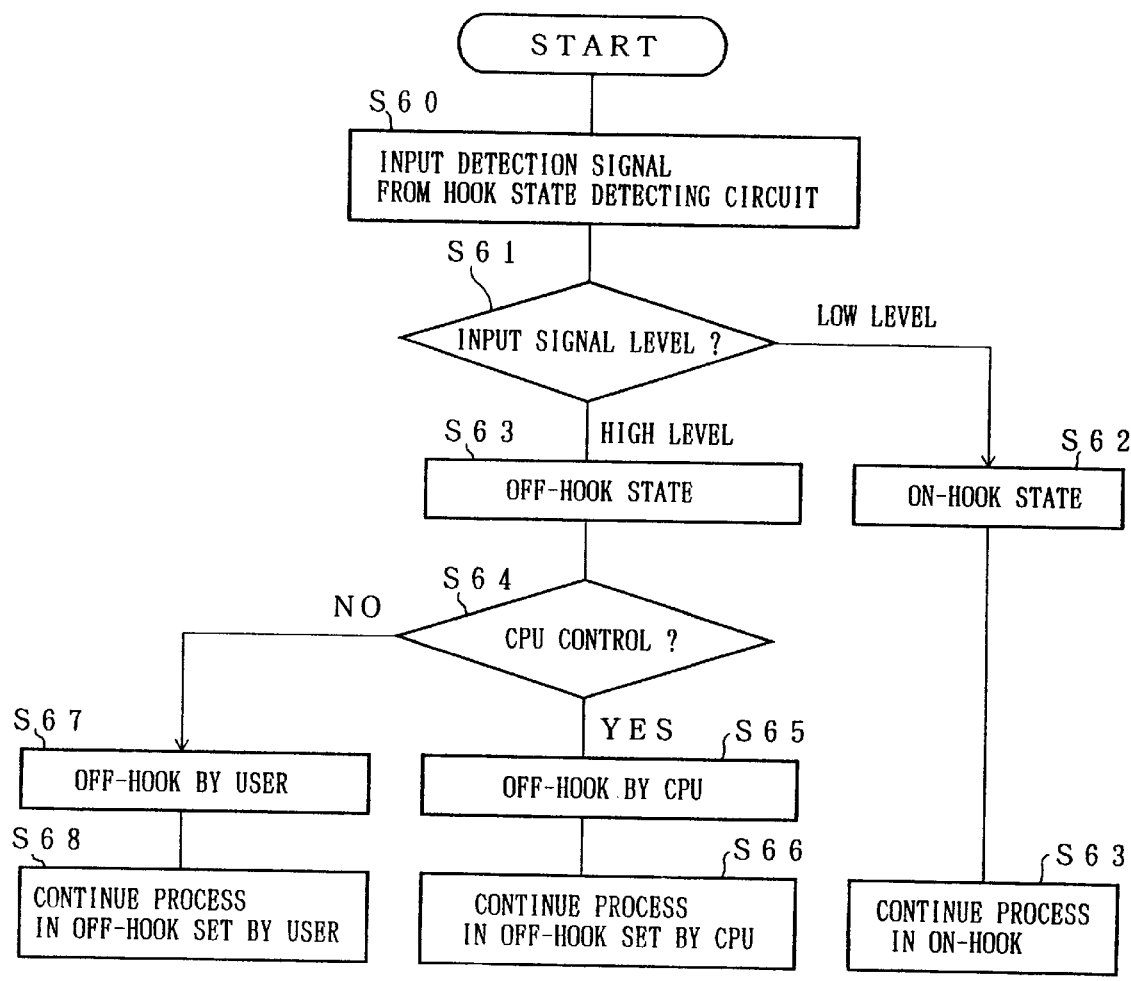
FIG. 13 is a flowchart showing a hook state detecting process by the CPU of the communication device provided with the hook state detecting circuit.

The following descriptions will discuss still another embodiment of the present invention in reference FIG. 12 and FIG. 13. For convenience in explanations, members having the same functions as those of the aforementioned embodiment will be designated by the same reference numerals, and thus the descriptions thereof shall be omitted here.

A communication device 1 in accordance with the present embodiment is arranged such that a conventional hook state detecting circuit provided in the terminal equipment for switching the state of the cable channel between an on-hook state and an off-hook state is used also as DC current detection means for detecting the type of the connected channel without being controlled by the CPU of the communication device 1.

Even when it is not controlled by the CPU 8, in the case where the channel closing section 11 is switched ON, and the communication device is set in the off-hook state, for example, when the user holds up the handset, it is required for the CPU 8 to perform the communication operation only after confirming the hook state.

Known methods for detecting the on-hook/off-hook state include: a method of adopting a hook state detection switch which is linked with the hook switch for connecting a channel; and a method of detecting the DC current flowing through the cable channel. In, the present embodiment, the latter method is adopted.

FIG. 12 shows a schematic circuit structure of a hook state detecting circuit 100. The hook state detecting circuit 100 is formed in the NCU 5 shown in FIG. 1. The hook state detecting circuit 100 has the same configuration as the DC current detecting circuit 10 (see FIG. 1) of the first embodiment 1, and thus the structure of the hardware of the communication device 1 in accordance with the present embodiment is the same as that of the first embodiment.

In the state where the cable channel is connected to the communication device 1, when the user takes an action such as holding up the handset, etc., the channel closing section 11 is closed, and the communication device 1 is set in the off-hook state without being controlled by the CPU 8. As a result, a DC current flows through the cable channel, and a detection signal of the high level is outputted to the CPU 8 from the hook state detecting circuit 100. As the DC current does not flow in the cable channel in the on-hook state, an output signal from the hook state detecting circuit 100 is in the low level. Therefore, the CPU 8 can determine the hook state of the cable channel based on the output from the hook state detecting circuit 100.

The hook state detecting operation by the CPU 8 of the communication device 1 in accordance with the present embodiment will be explained in reference to the flowchart of FIG. 13.

A detection signal from the hook state detecting circuit 100 is inputted to the CPU 8 (S60), and the CUP 8 determines whether the input signal is high level or low level (S61). If the input signal is low level, the CPU 8 determines that the cable channel is in the on-hook state (S62), and continues the process in the on-hook state (S63). On the other hand, if the input signal from the hook state detecting circuit 100 is high level, the CPU 8 determines that the cable channel is in the off-hook state (S63), and subsequently determines if the CPU 8 itself performs the off-hook control (S64). If YES in S64, the CPU 8 determines that the current state of the cable channel is the off-hook state set by the CPU 8 itself (S65), and the off-hook process set by the CPU 8 continues (S66). On the other hand, if NO in S64, the CPU 8 determines that the current state of the cable channel is the off-hook state set by the user (S67), and the off-hook process set by the user continues (S68).

By using the hook state detecting circuit 100 also as the DC current detection means for detecting the DC current supplied from the cable channel, the type of the connected channel can be detected as in the same manner as the first embodiment. In the communication device 1 in accordance with the present embodiment, the connected channel identification process is the same as that of the first embodiment except that the output signal from the hook state detecting circuit 100 is used as a DC current detection signal in replace of that from the DC current detecting circuit 10. Therefore, the explanations thereof shall be omitted here.

As described, the communication device 1 in accordance with the present embodiment is arranged such that the hook state detecting circuit 100 for detecting whether the cable channel is in the on-hook state or in the off-hook state by detecting the existence of the current flowing through the cable channel also serves as the DC current detection means for detecting the type of the connected channel.

As described, by using the conventional hook state detecting circuit 100 provided in the device, which enables the state of the cable channel to be switched between the on-hook state and the off-hook state, also as the DC current detection means for detecting the type of the connected channel, the identification of the cable channel and the radio channel is enabled without increasing the number of components, the cost of each component and the area required for mounting the components.

[FOURTH EMBODIMENT]

The following descriptions will discuss still another embodiment of the present invention in reference FIG. 1, FIG. 12, FIG. 14 and FIG. 15. For convenience in explanations, members having the same functions as those of the aforementioned embodiment will be designated by the same reference numerals, and thus the descriptions thereof shall be omitted here.

A communication device 1 in accordance with the present embodiment is arranged such that a conventional CPC signal detecting circuit provided in a terminal equipment having a function for controlling a communication based on a CPC signal serves also as DC current detection means for detecting the type of the connected channel.

In some area including the United State, etc., when communicating through the cable channel, in order to inform the receiving end that the state of the transmitting end is switched from the off-hook state to the on-hook state (the channel is disconnected by the transmitting end), a signal called CPC signal which temporarily becomes in a flash state is transmitted to the cable channel of the receiving end. Here, the flash state suggests the state where the supply of the current through the cable channel is stopped for a predetermined time in the off-hook state.

Figure 14:
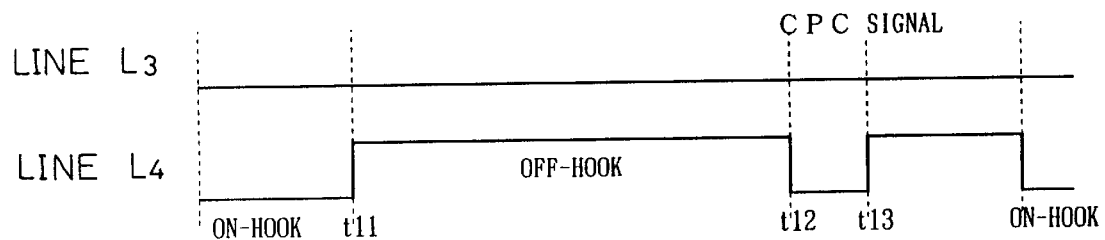
FIG. 14 is a timing chart showing a change in potential of the two-wire circuit, which explains a CPC signal.

The CPC signal will be explained in reference to the timing chart of FIG. 14 that shows a change in potential of the two-wire channel. In the figure, one wire of the two-wire system is designated by a wire $L_3$ (corresponding to the first wire 16a of the cable 16 for cable channel of FIG. 1) and the other wire is designated by a wire $L_4$ (corresponding to a second wire 16b of the cable 16 for cable channel of FIG. 1).

In response to a calling signal from the cable channel, the cable channel is switched at $t_{11}$ from the on-hook state where the channel closing section 11 of FIG. 1 is opened to the off-hook state where the channel closing section 11 is closed. In this state, a DC current is supplied through the cable channel, and, for example, the wire $L_4$ is switched to the high level. Thereafter, the communication is performed through the cable channel, and the current supply from the exchange of the cable channel is stopped at $t_{12}$ where the channel is disconnected by the transmitting end. The supply of the current is stopped for a predetermined time, and the supply of the current from the exchange is restarted after the predetermined time has elapsed, i.e., at $t_{13}$. This temporal stoppage of current from $t_{12}$ to $t_{13}$ (flash) in the off-hook state is recognized as the CPC signal.

The CPC signal can be detected by detecting the existence of the DC current flowing through the cable channel. The schematic circuit structure of a CPC signal detecting circuit 200 for detecting the CPC signal is shown in FIG. 12. The CPC signal detecting circuit 200 is formed in the NCU 5 shown in FIG. 1. The CPC signal detecting circuit 200 has the same structure as the DC current detecting circuit 10 (see FIG. 1) of the first embodiment. Thus, the structure of the hardware of the communication device 1 of the present embodiment is the same as that of the first embodiment.

During the communicating operation with, the transmitting end, a DC current is being supplied by the exchange for the cable channel. In this state, the detecting signal of the high level is inputted to the CPU 8 from the CPC signal detecting circuit 200. When the CPC signal is transmitted to the communication device 1 through the cable channel as the channel is disconnected by the transmitting end, since the supply of the DC current from the exchange is stopped while the CPC signal is being transmitted, the signal of the low level is outputted from the CPC signal detecting circuit 200 for a predetermined time. The CPU 8 supervises the output signal from the CPC signal detecting circuit 200 in the off-hook state (during the communication with the transmitting end), according to the CPC signal detection program stored in the ROM 9 (see FIGS. 3 and 4), so as to determine the receiving of the CPC signal.

Figure 15:
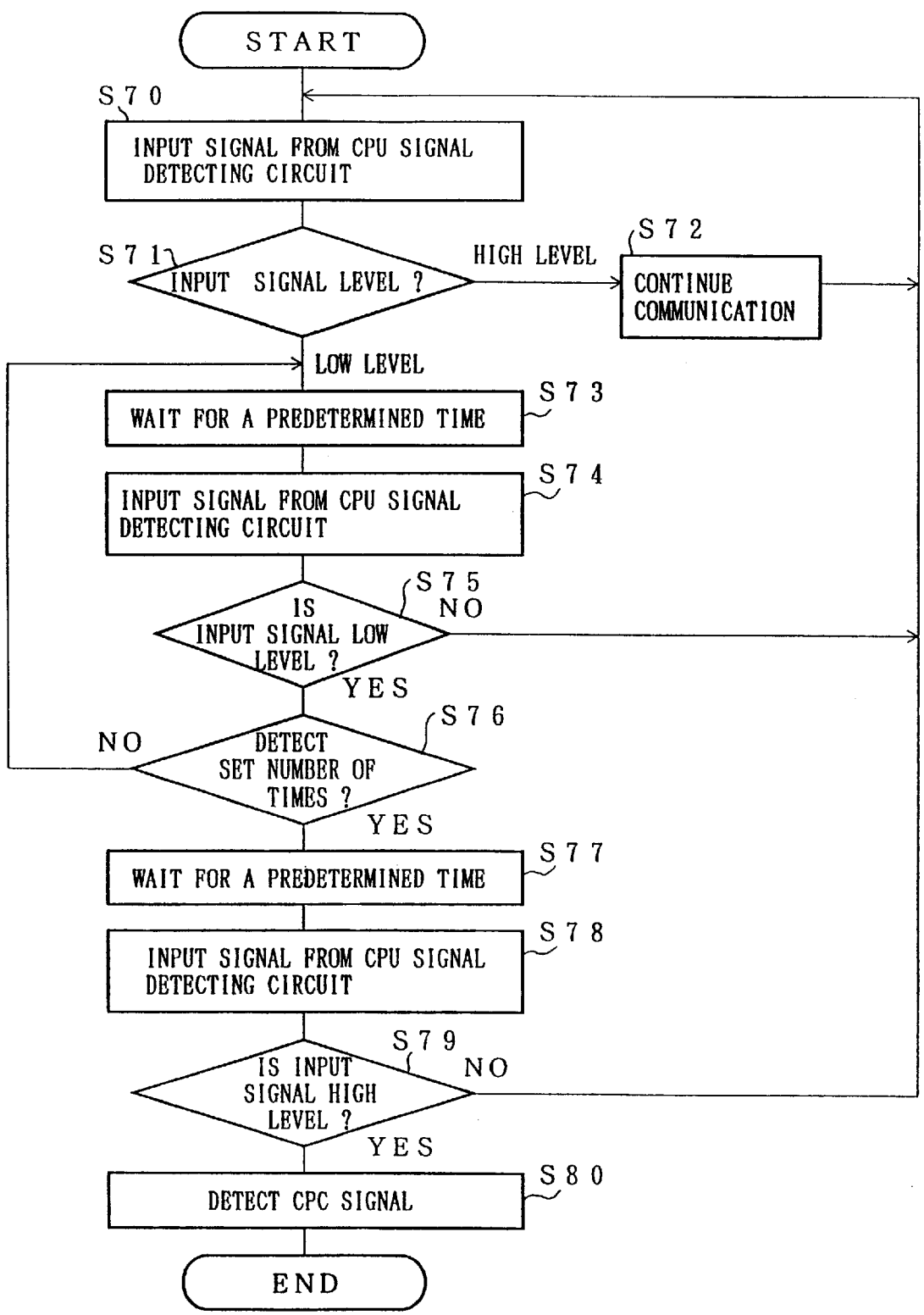
FIG. 15 is a flowchart showing a CPC signal detecting process by the CPU in the communication device provided with the CPC signal detecting circuit.
Figure 16:
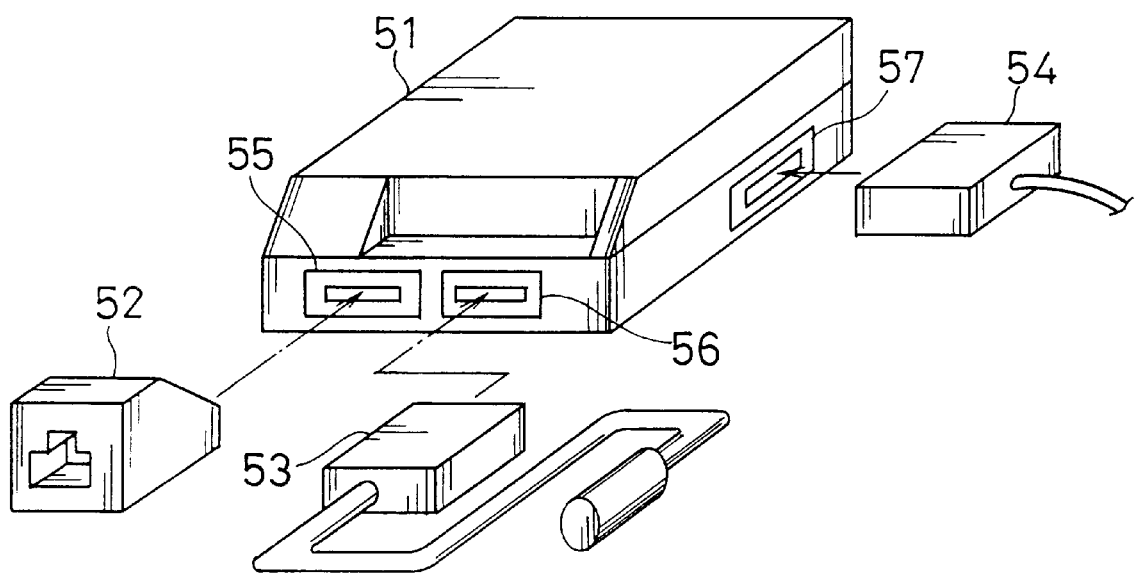
FIG. 16 is a perspective view showing a schematic outer structure of a conventional communication device.
Figure 17:
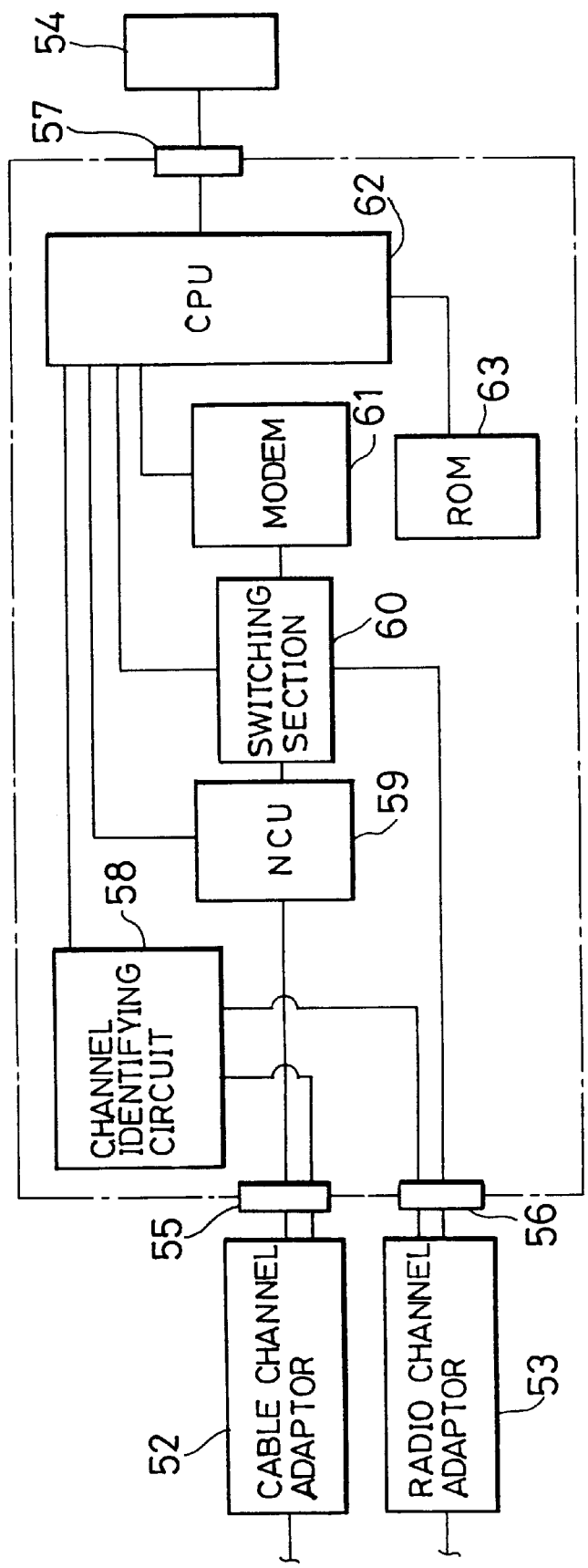
FIG. 17 is a block diagram showing a schematic configuration of the conventional communication device.
Figure 18:
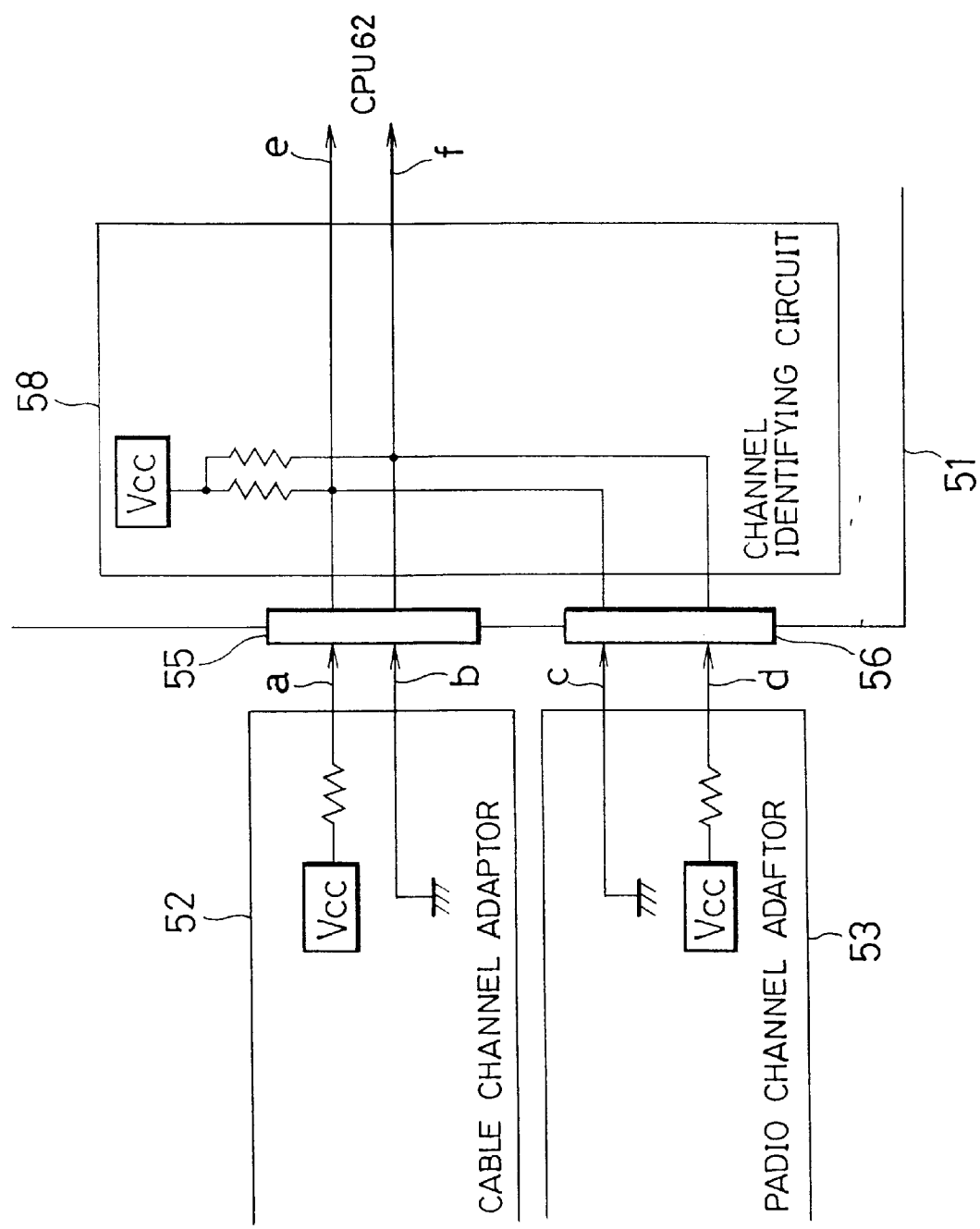
FIG. 18 is a circuit diagram showing a schematic structure of a channel determining circuit and of a channel adapter of the conventional communication device.

The CPC signal detecting operation by the CPU 8 of the communication device 1 in accordance with the present embodiment will be explained below in reference to the flowchart of FIG. 15.

A signal from the CPC signal detecting circuit 200 (S70) is inputted to the CPU 8, and the CPU 8 determines whether the input signal is high levee or low level (S71). While the input signal remains in the high level, the communication with the transmitting end is continued (S72).

If the input signal from the CPC signal detecting circuit 200 is low level in S71, the CPU 8 is set in the wait state for a predetermined time (shorter than the regular time of the CPC signal) (S73). Thereafter, a signal is inputted from the CPC signal detecting circuit 200 (S74). Then, it is determined if the input signal remains in the low level (S75). If the input signal is high level in S75, the sequence goes back to S70. On the other hand, if the input signal remains in the low level in S75, it is confirmed whether the detection loop (S73 through S76) has been performed a predetermined number of times. Here, it is set such that the product of the number of times in S76 (processed number of times in the detection loop) and the wait time in S73 is substantially identical with the regular time of the CPC signal. After completing the detection loop process a predetermined number of times, the CPU 8 is set in a wait state for a predetermined time (S77), and again, a signal from the CPC signal detecting circuit 200 is inputted (S78). Then, it is confirmed whether the input signal is switched to the high level (S79). As a result of this determination, if the input signal remains in the low level, the CPU 8 determines that the input signal exceeds the width of the CPC signal, and the process goes back to S70. On the other hand, if the input signal level is high level in S79, it is determined that the CPC signal is inputted through the cable channel (S80). After detecting the CPC signal, the CPU 8 executes a predetermined program.

In the described sequence, in order to avoid an detection error due to noise, etc., it is ensured in S73–S75 that the CPC signal is not narrower than the width of the regular CPC signal, and also in S77–S79 that the CPC signal is not wider than the regular CPC signal.

By using the CPC signal detecting circuit 200 also as the DC current detection means for detecting a DC current supplied through the cable channel, the type of the connected channel can be detected in the same manner as the first embodiment. The connected channel identification process of the communication device 1 in accordance with the present embodiment is the same as the first embodiment except that the output signal from the CPC signal detecting circuit 200 is used as the DC current detection signal in replace of that from the DC current detecting circuit 10. Thus, the description thereof shall be omitted here.

As described, the communication device 1 in accordance with the present embodiment is arranged such that the CPC signal detecting circuit 200 for detecting the CPC signal by detecting the stoppage period of stopping the supply of the current through the cable channel during the communication serves also as the DC current detection means for detecting the type of the connected channel.

As described, by using the conventional CPC signal detecting circuit 200 formed in the device provided with the communication control function based on the CPC signal, the identification of the cable channel/radio channel is enabled without increasing the number of components, the cost of each component, the area required for mounting the components, etc.

In the described preferred embodiments, the external control terminal is connected to the communication device 1. However, the present invention is not limited to this arrangement, and for example, the communication device 1 may be provided in the terminal equipment. The communication device of, the present invention may be stored in or connected to the following: a terminal equipment for communication through the cable channel and the radio channel as a medium, such as a notebook personal computer, a sub-notebook personal computer, a pocket-size computer, an electronic organizer, a portable facsimile terminal, a portable data communication terminal, a telephone machine, etc.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A communication device, comprising:
   cable channel connection means for connecting a cable channel having a DC current power supply;
   radio channel connection means for connecting a radio channel;
   inversion detection means for detecting a DC current flowing through the cable channel and supervising a direction of the DC current after a calling is made through the cable channel so as to determine if a receiving end has responded;
   dial-tone signal detection means for detecting a dial-tone signal transmitted through the radio channel in an off-hook state;
   connected channel detection means which determines that the cable channel is connected to said communication device when said inversion detection means detects the DC current flowing through the cable channel, while it determines that the radio channel is connected to said communication device when said dial-tone signal detection means detects the dial-tone signal; and
   switch means for switching an input/output path for a communication signal between said cable channel connection means and said radio channel connection means according to a result of detection by said connected channel detection means.

2. The communication device as set forth in claim 1, wherein said inversion detection means includes:
   light emitting means which emits light in response to the DC current from the DC current supply through the cable channel; and
   detecting signal output means for outputting a DC current detection signal indicating that the DC current is detected upon receiving light from said light emitting means to said connected channel detection means.

3. The communication device as set forth in claim 1, wherein:
   said switch means switches an input/output path for a communication signal to said cable channel connection means when said connected channel detection means detects that the cable channel is connected to said communication device irrespectively of whether or not the radio channel is connected.

4. The communication device as set forth in claim 1, wherein:
   said connected channel detection means includes determination result output means for outputting a result of determination as connection channel information to a terminal equipment which is to communicate with a cable network or a radio network through said communication device.

5. The communication device as set forth in claim 1, further comprising circuit closing means which opens and closes a circuit, wherein:
   said circuit closing means forms a closed circuit including the cable channel in its closed position; and
   said connected channel detection means controls said inversion detection means to detect an existence of the DC current flowing through said closing circuit in a closed position of said circuit closing means.

6. A communication device comprising:
   cable channel connection means for connecting a cable channel having a DC current power supply;
   radio channel connection means for connecting a radio channel;
   CPC signal detection means for detecting a DC current flowing through the cable channel and detecting a CPC signal based on a period in which a supply of the DC current is stopped;
   dial-tone signal detection means for detecting a dial-tone signal transmitted through the radio channel in an off-hook state;
   connected channel detection means which determines that the cable channel is connected to said communication device when said CPC signal detection means detects the DC current flowing through the cable channel, while it determines that the radio channel is connected to said communication device when said dial-tone signal detection means detects the dial-tone signal; and
   switch means for switching an input/output path for a communication signal between said cable channel connection means and said radio channel connection means according to a result of detection by said connected channel detection means.

7. A communication system, comprising:
   cable channel connection means for connecting a cable channel having a DC current power supply;
   radio channel connection means for connecting a radio channel;

inversion detection means for detecting a DC current flowing through the cable channel and supervising a direction of the DC current after a calling is made through the cable channel so as to determine if a receiving end has responded;

dial-tone signal detection means for detecting a dial-tone signal transmitted through the radio channel in an off-hook state;

connected channel detection means which determines that the cable channel is connected to said communication system when said inversion detection means detects the DC current flowing through the cable channel, while it determines that the radio channel is connected to said communication system when said dial-tone signal detection means detects the dial-tone signal; and switch means for switching an input/output path for a communication signal between said cable channel connection means and said radio channel connection means according to a result of detection by said connected channel detection means.

8. The communication system as set forth in claim 7 further comprising terminal equipment which includes:

display means for displaying candidate protocols, so that a user may select a protocol desired enabling communication to be performed based on the selected protocol by the user.

9. A communication system comprising:

cable channel connection means for connecting a cable channel having a DC current power supply;

radio channel connection means for connecting a radio channel;

CPC signal detection means for detecting a DC current flowing through the cable channel and detecting a CPC signal based on a period in which a supply of the DC current is stopped;

dial-tone signal detection means for detecting a dial-tone signal transmitted through the radio channel in an off-hook state;

connected channel detection means which determines that the cable channel is connected to said communication system when said CPC signal detection means detects the DC current flowing through the cable channel, while it determines that the radio channel is connected to said communication system when said dial-tone signal detection means detects the dial-tone signal; and switch means for switching an input/output path for a communication signal between said cable channel connection means and said radio channel connection means according to a result of detection by said connected channel detection means.

10. The communication system as set forth in claim 9 further comprising terminal equipment which includes:

display means for displaying candidate protocols, so that a user may select a protocol desired enabling communication to be performed based on the selected protocol by the user.

11. A communication system, comprising:

cable channel connection means for connecting a cable channel having a DC current power supply;

radio channel communication means for connecting a radio channel;

hook state detection means for detecting an existence of a DC current flowing through the cable channel and detecting whether the cable channel is in an on-hook state or in an off-hook state;

dial-tone signal detection means for detecting a dial-tone signal transmitted through the radio channel in the off-hook state;

connected channel detection means which determines that the cable channel is connected to said communication device when said hook state detection means detects the DC current flowing through the cable channel, while determines that the radio channel is connected to said communication device when said dial-tone signal detection means detects the dial-tone signal;

switch means for switching an input/output path for a communication signal between said cable channel connection means and said radio connection means according to a result of detection by said connected channel detection means; and terminal equipment that includes:

display means for displaying candidate protocols, so that a user may select a protocol desired enabling communication to be performed based on the selected protocol by the user.

\* \* \* \* \*